United States Patent
Halsband et al.

(10) Patent No.: US 11,643,227 B2
(45) Date of Patent: May 9, 2023

(54) IN-ORBIT SPACECRAFT SERVICING THROUGH UMBILICAL CONNECTORS

(71) Applicant: Astroscale Israel Ltd., Tel Aviv (IL)

(72) Inventors: Arie Halsband, Tel Aviv (IL); Rami Shamir, Tel Aviv (IL); Nevo Taaseh, HaElah (IL)

(73) Assignee: Astroscale Israel, Ltd., Tel Aviv (IL)

( * ) Notice: Subject to any disclaimer, the term of this patent is extended or adjusted under 35 U.S.C. 154(b) by 298 days.

(21) Appl. No.: 17/027,499

(22) Filed: Sep. 21, 2020

(65) Prior Publication Data

US 2021/0086923 A1    Mar. 25, 2021

Related U.S. Application Data

(60) Provisional application No. 62/904,715, filed on Sep. 24, 2019.

(51) Int. Cl.
  *B64G 4/00* (2006.01)
  *B64G 1/64* (2006.01)
  *B64G 1/42* (2006.01)

(52) U.S. Cl.
  CPC .............. *B64G 4/00* (2013.01); *B64G 1/42* (2013.01); *B64G 1/64* (2013.01); *B64G 2004/005* (2013.01)

(58) Field of Classification Search
  CPC ...... B64G 1/42; B64G 1/64; B64G 2004/005; B64G 4/00
  USPC ...................................... 244/172.5
  See application file for complete search history.

(56) References Cited

U.S. PATENT DOCUMENTS

| | | | |
|---|---|---|---|
| 4,500,057 A | | 2/1985 | Duwelz |
| 4,976,399 A | | 12/1990 | Bay |
| 5,582,366 A | * | 12/1996 | Hamant ................... B64G 5/00 244/135 R |
| 7,823,837 B2 | | 11/2010 | Behrens |
| 8,181,911 B1 | * | 5/2012 | Gryniewski ......... B64G 1/1078 244/172.4 |
| 8,448,904 B2 | | 5/2013 | Gryniewski |
| 10,420,216 B2 | | 9/2019 | Govrin |
| 10,611,504 B2 | | 4/2020 | Halsband |
| 10,625,882 B2 | | 4/2020 | Reitman |

(Continued)

FOREIGN PATENT DOCUMENTS

| | | |
|---|---|---|
| DE | 4221976 | 1/1994 |
| EP | 2134606 | 9/2018 |
| WO | WO 2019/068547 | 4/2019 |

OTHER PUBLICATIONS

ELSA-D: an In-orbit End-of-Life Demonstration Mission, Blackerby et al, IAC-18, Sep. 14, 2018.

(Continued)

*Primary Examiner* — Brady W Frazier
(74) *Attorney, Agent, or Firm* — Critical Path IP Law, LLC.

(57) ABSTRACT

A spacecraft servicing system to provide in-orbit servicing through the umbilical connectors of a spacecraft. In one embodiment, a manipulator arm maneuvers a servicer umbilical to form an electrical connection between a servicer spacecraft and an umbilical connector of a client spacecraft, the umbilical connector conventionally used solely for ground-based operations. In one feature, the electrical connection is used to provide power or software upgrades to the client spacecraft.

20 Claims, 10 Drawing Sheets

(56) References Cited

U.S. PATENT DOCUMENTS

| | | | |
|---|---|---|---|
| 2004/0026571 A1* | 2/2004 | Scott .................. | B64G 1/36 |
| | | | 244/172.5 |
| 2007/0051854 A1* | 3/2007 | Behrens ................ | B64G 1/402 |
| | | | 244/172.3 |
| 2007/0228219 A1* | 10/2007 | Behrens ............... | B64G 1/1078 |
| | | | 244/172.5 |
| 2015/0097084 A1* | 4/2015 | Szabo .................. | B64G 1/26 |
| | | | 244/171.1 |
| 2015/0210174 A1 | 7/2015 | Settele | |
| 2015/0217876 A1* | 8/2015 | Halsband ............... | B64G 1/10 |
| | | | 244/172.6 |
| 2018/0229865 A1 | 8/2018 | Maeda | |
| 2018/0251240 A1 | 9/2018 | Reitman | |
| 2019/0023420 A1 | 1/2019 | Nicholson | |
| 2020/0223568 A1 | 7/2020 | Nicholson | |

OTHER PUBLICATIONS

Falcon 9 Lunch Payload User's Guide, Rev. 1, Space Exploration Technologies, 09-S-0347, circa 2009.
Ariane 5 User's Manual, Issue 5 Revision 1, Jul. 2011, Arianespace, pgs. Cover Sheet, 5-10, and 5-11.
International Searching Authority, International Search Report and Written Opinion dated Jan. 12, 2021 in PCT/IB2020/058852.

\* cited by examiner

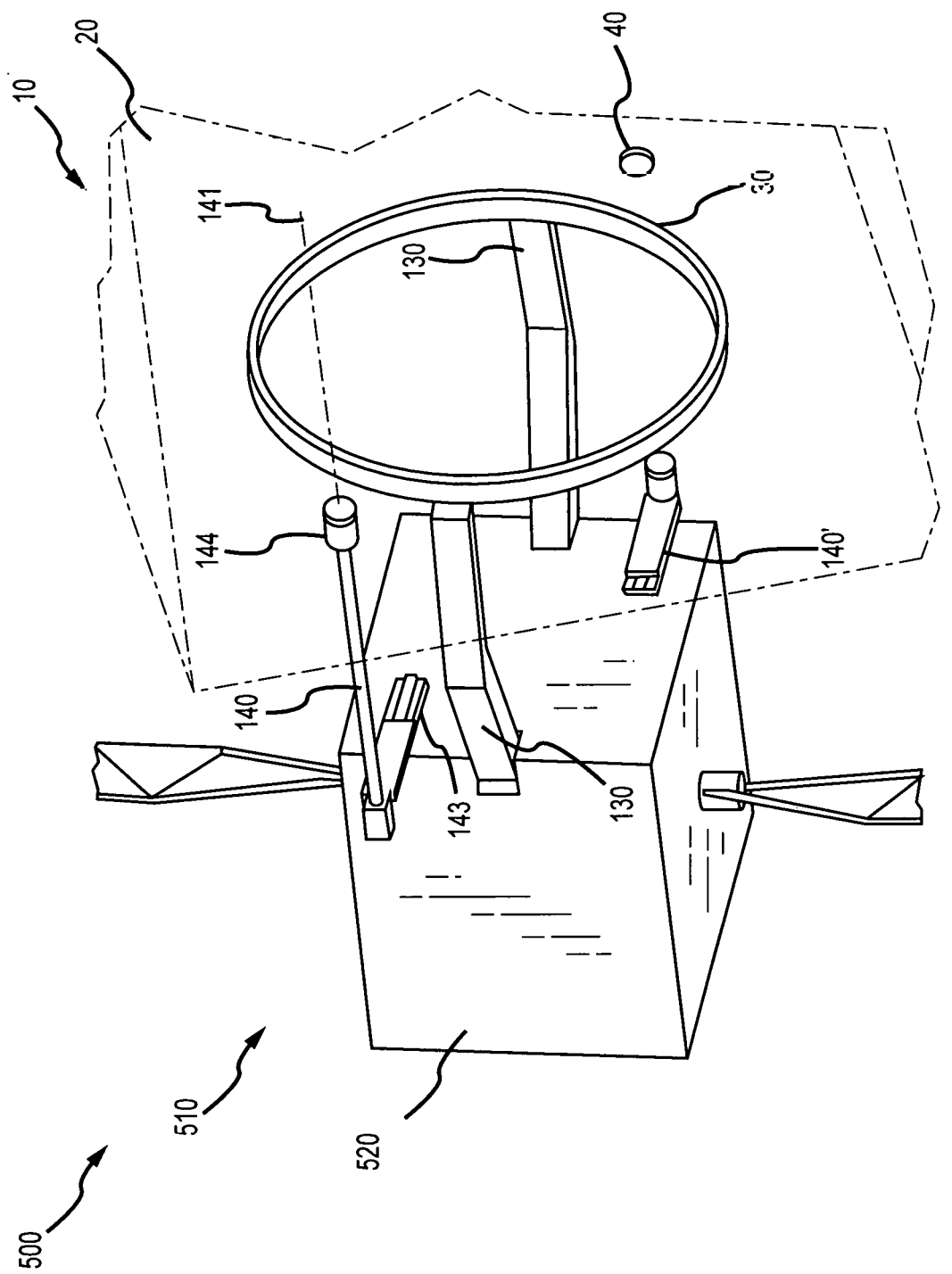

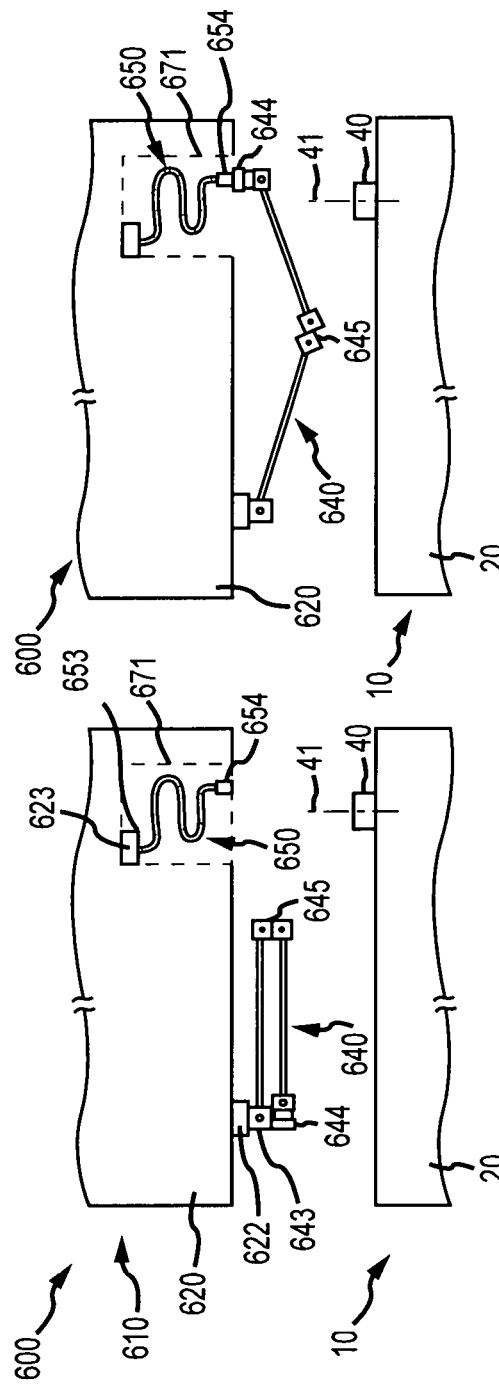
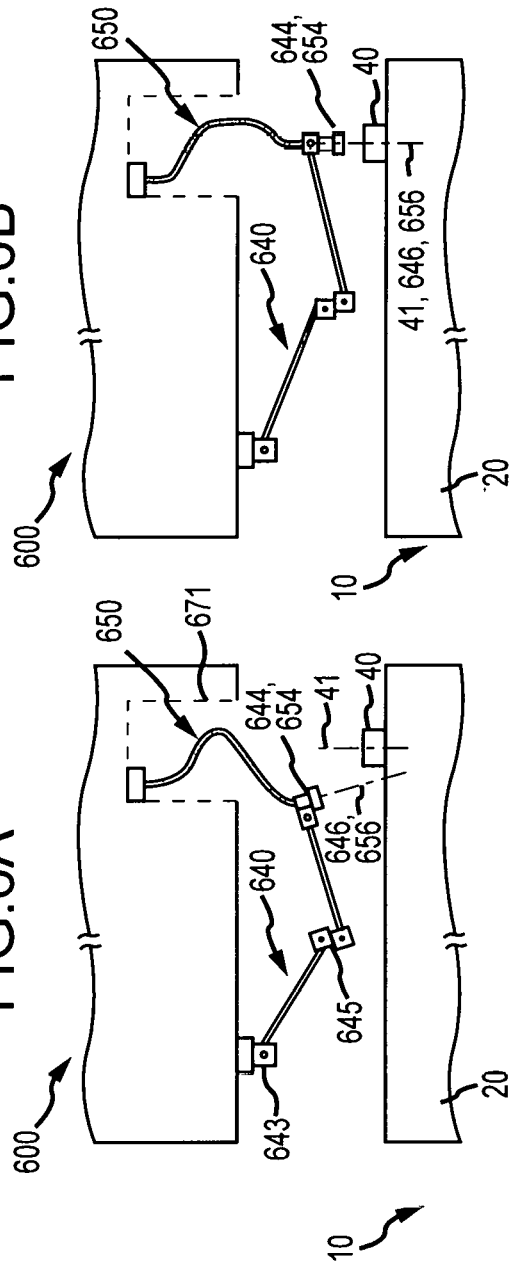

IN-ORBIT SPACECRAFT SERVICING THROUGH UMBILICAL CONNECTORS

CROSS-REFERENCE TO RELATED APPLICATION

This application is a nonprovisional patent application of and claims the benefit of U.S. Provisional Patent Application No. 62/904,715 filed Sep. 24, 2019 and titled "In-orbit Service to a Spacecraft Through Its External Connectors," the disclosure of which is hereby incorporated herein by reference in entirety.

FIELD

The disclosure relates generally to systems and methods of use to provide servicing of a space object, and more specifically to systems and methods of use to provide in-orbit servicing of a spacecraft through the umbilical connectors of the spacecraft.

BACKGROUND

Throughout ground and launch operations, the connection with internal systems onboard a spacecraft is done through electrical connection interfaces on the outer surface of the spacecraft. For example, testing of a subsystem on the ground, while covered by outer protection layers, may be achieved through a dedicated connector on the outer panel through which the status of the subsystem may be checked and test protocols may be run. Another example are the connectors, known as "umbilical connectors," through which the spacecraft is tested, monitored and controlled while on the launcher during launch operations, and are separated from its mating part on the launcher side during the separation of the spacecraft from the launcher.

Conventionally, spacecraft are not intended to be communicated with through these external connectors after launch, and all communication thereafter is done through telecommunication from the ground (by Radio Frequency (RF) transmissions with the ground, e.g. in C, X, Ku, S bands). For example, geostationary satellites for media transmission are not intended to be in physical contact ever again once separated into orbit from a launcher's last stage and umbilical connectors are not designed to be connected again when in orbit. Any electrical interface with the onboard subsystems is mediated by the telecommand system, including monitoring state variables, housekeeping, upgrading of software packages, and troubleshooting of mishaps and failures. Such interventions are limited in nature and cannot be of assistance when, for example, the telecommunication system itself has failed, malfunctioned, or degraded in performance to prevent the spacecraft from performing its intended mission or executing nominal operations. Similarly, a physical failure, such as a battery cell failure, cannot be recovered merely by reprograming the system's wiring, let alone by upgrading and enhancing the physical building blocks of the spacecraft.

In-orbit spacecraft servicing is rarely performed, and when it is, it is typically a costly and specialized endeavor. For example, the servicing of the Hubble Space Telescope required elaborate and one-off specialized hardware and procedures. What is needed is a system and method to service spacecraft that is reliable, relatively inexpensive, and applicable to a wide set of spacecraft. The disclosure solves this need by providing a system and method to service in-orbit spacecraft through the umbilical connector of a client spacecraft.

The in-orbit spacecraft servicing enabled by the disclosed system and method may take many forms and may be occasional or chronic. Electric power may be provided to the serviced spacecraft, software upgrades may be provided to include cyber security upgrades, system-level maintenance to include software maintenance may be performed, for example. Orbital maintenance may be performed, to include relatively modest orbital adjustments and attitude control through to transfers between orbits (e.g. transfer from a parking or graveyard orbit to an operational geostationary orbit). The in-orbit servicing may be occasional meaning a specific, relatively short duration servicing is performed, or may be chronic meaning that the servicing spacecraft remains docked with the serviced spacecraft for an extended period. The servicer spacecraft may provide thrust and momentum control of the combined servicer/client spacecraft system, either on an occasional basis or a chronic basis.

SUMMARY

An in-orbit spacecraft servicing system to provide in-orbit servicing through umbilical connectors of a spacecraft is provided. The spacecraft servicing system uses a computer-controlled manipulator arm which unfurls and connects a servicer umbilical between a servicer spacecraft and an umbilical external connector of a client spacecraft, even though umbilical connectors are originally designed and conventionally used solely for ground-based operations, typically manually connected, and not part of any client docking or capture system. The umbilical external connector of a client spacecraft is typically located on the relatively unpopulated aft spacecraft panel which faces away from the Earth, thereby not interfering with the operational forward panel of the spacecraft which faces the Earth (i.e. nadir). The electrical connection may be used for a suite of purposes, such as electrical power transfer, software upgrades such as security upgrades, client software maintenance or repair, etc. In one embodiment, the servicer umbilical is disconnected from the client spacecraft and furled to its original position on the servicer spacecraft after servicing is completed. In another embodiment, a detachable service package provided by the servicer spacecraft is attached to the client spacecraft and electrically connected through the umbilical external connector of the client spacecraft.

In one embodiment, an in-orbit spacecraft servicing system is disclosed, the system comprising: a servicer spacecraft comprising: a servicer body; a set of capture arms extending from the servicer body and operating to engage a client in-orbit spacecraft; at least one servicer umbilical with a servicer umbilical first end attached to the servicer body and a servicer umbilical second end fitted with a servicer umbilical end connector, the servicer umbilical end connector configured to form a connection with a client umbilical connector of the client in-orbit spacecraft; a manipulator arm with a manipulator arm first end coupled to the servicer body and a manipulator arm second end configured to attach to and maneuver the servicer umbilical second end; and a processor operating to control the manipulator arm; wherein: the manipulator arm maneuvers the servicer umbilical second end to form a connection between the servicer umbilical end connector and the client umbilical connector.

In one aspect, the connection is an electrical connection. In another aspect, the servicer spacecraft further comprises an auxiliary power supply. In another aspect, the electrical power provided by the auxiliary power supply is transferred from the servicer spacecraft to the client in-orbit spacecraft through the electrical connection. In another aspect, the servicer further comprises a service package detachable from the servicer body and configured to attach to the client in-orbit spacecraft. In another aspect, the service package provides electrical power to the client in-orbit spacecraft through the connection. In another aspect, the set of capture arms engage an interface ring of the client in-orbit spacecraft at a selectable interface ring clocking position. In another aspect, the connection formed between the servicer umbilical end connector and the client umbilical connector remains secure after the manipulator arm detaches from the servicer umbilical end connector. In another aspect, the servicer umbilical comprises a set of electrical cables configured to transfer at least one of electrical power and electrical signals to the client in-orbit spacecraft. In another aspect, the servicer umbilical end connector is coupled to at least one sensor, the at least one sensor providing sensor data to the processor to assist the servicer umbilical end connector to form the connection with the client umbilical connector. In another aspect, the at least one sensor is a micro camera. In another aspect, the servicer umbilical end connector is further coupled to an extension guide, the extension guide forming a cone shaped extension from the servicer umbilical end connector to facilitate alignment of a servicer umbilical end connector with a client umbilical connector z-axis.

In another embodiment, an in-orbit spacecraft servicing system is disclosed, the system comprising: a servicer spacecraft comprising: a servicer body; a set of two or more capture arms extending from the servicer body and operating to engage a client in-orbit spacecraft; at least one servicer umbilical with a servicer umbilical first end attached to the servicer body and a servicer umbilical second end fitted with a servicer umbilical end connector, the servicer umbilical end connector configured to form a connection with a client umbilical connector of the client in-orbit spacecraft; a manipulator arm with a manipulator arm first end coupled to the servicer body and a manipulator arm second end fitted with a sensor and configured to maneuver the servicer umbilical second end; an auxiliary power supply; and a processor operating to control the manipulator arm; wherein: the sensor provides sensor data to the processor to assist the servicer umbilical end connector to form the connection with the client umbilical connector; the servicer umbilical comprises a set of electrical cables configured to transfer electrical power and electrical signals to the client in-orbit spacecraft; the auxiliary power supply provides electrical power from the servicer spacecraft to the client in-orbit spacecraft through the servicer umbilical; and the manipulator arm maneuvers the servicer umbilical second end to form a connection between the servicer umbilical end connector and the client umbilical connector.

In yet another embodiment, a method of servicing an in-orbit spacecraft is disclosed, the method comprising: providing a servicer spacecraft comprising: a servicer body; a set of capture arms extending from the servicer body and operating to engage a client in-orbit spacecraft; at least one servicer umbilical with a servicer umbilical first end attached to the servicer body and a servicer umbilical second end fitted with a servicer umbilical end connector, the servicer umbilical end connector configured to form a connection with a client umbilical connector of the client in-orbit spacecraft; a manipulator arm with a manipulator arm first end coupled to the servicer body and a manipulator arm second end configured to maneuver the servicer umbilical second end; and a processor operating to control the manipulator arm; coupling the servicer spacecraft and the client in-orbit spacecraft using the set of capture arms; controlling the manipulator arm to position the servicer umbilical second end to a position adjacent the client umbilical connector; and plugging the servicer umbilical end connector into the client umbilical connector; wherein: an electrical connection is formed between the servicer spacecraft and the client in-orbit spacecraft.

In one aspect, the method further comprises the step of transferring electrical power from an auxiliary power unit of the servicer spacecraft to the client in-orbit spacecraft through the electrical connection. In another aspect, the method further comprises the step of transferring electrical signals from the servicer spacecraft to the client in-orbit spacecraft through the electrical connection. In another aspect, the method further comprises the step of rotating the servicer umbilical end connector to a selected clock position of the client umbilical connector. In another aspect, the method further comprises the step of processing a set of signals from a sensor mounted on the servicer umbilical second end, the set of signals enabling precise positioning of the servicer umbilical second end to a position adjacent the client umbilical connector. In another aspect, the set of capture arms engage an interface ring of the client in-orbit spacecraft. In another aspect, the set of capture arms are configured to rotate the client in-orbit satellite about a z-axis of the client in-orbit satellite and the manipulator arm operates with three degrees of freedom.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The phrase "client spacecraft" means a spacecraft operating in-orbit that is to be serviced, such as a client satellite to include a client communications satellite.

The phrase "servicer spacecraft" means a spacecraft that operates in-orbit to perform in-orbit servicing to a client spacecraft.

The phrase "umbilical connector" and "client umbilical connector" mean a connector of a client spacecraft that it traditionally used solely on the ground as an electrical connection to a client spacecraft and not intended for use in-orbit, versus a "servicing connector" which is deliberately intended to be used in-orbit for servicing.

The phrase "servicer umbilical" means an electrical connector, such as a cable, that connects between a servicer spacecraft and a client umbilical connector and may be similar if not identical to an umbilical used on the ground to connect with a client umbilical connector. The servicer umbilical may connect directly to the servicer spacecraft or may connect by way of an electrical cord, harness, etc. The term "means" as used herein shall be given its broadest possible interpretation in accordance with 35 U.S.C. Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g. analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, firmware code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 5 is a perspective view representation of another embodiment of an in-orbit spacecraft servicing system of the disclosure, the embodiment showing a servicer spacecraft docked with a client spacecraft, the servicer spacecraft having two manipulator arms each with an integrated servicer umbilical;

FIG. 6A is a close-up top view of another embodiment of an in-orbit spacecraft servicing system of the disclosure, the embodiment showing a servicer spacecraft docked with a client spacecraft (capture arms not shown for clarity), the manipulator arm in a first manipulator arm state and the servicer umbilical in a first servicer umbilical state;

FIG. 6B is a close-up top view of another embodiment of an in-orbit spacecraft servicing system of the disclosure, the embodiment showing a servicer spacecraft docked with a client spacecraft (capture arms not shown for clarity), the manipulator arm in a second manipulator arm state and the servicer umbilical in a second servicer umbilical state;

FIG. 6C is a close-up top view of another embodiment of an in-orbit spacecraft servicing system of the disclosure, the embodiment showing a servicer spacecraft docked with a client spacecraft (capture arms not shown for clarity), the manipulator arm in a third manipulator arm state and the servicer umbilical in a third servicer umbilical state;

FIG. 6D is a close-up top view of another embodiment of an in-orbit spacecraft servicing system of the disclosure, the embodiment showing a servicer spacecraft docked with a client spacecraft (capture arms not shown for clarity), the manipulator arm in a forth manipulator arm state and the servicer umbilical in a forth servicer umbilical state;

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

Generally, an in-orbit spacecraft servicing system operates to provide in-orbit servicing through available umbilical connectors of a spacecraft. After docking, the spacecraft servicing system uses a manipulator arm which connects a servicer umbilical between a servicer spacecraft and an umbilical connector of a client spacecraft. The umbilical connector is conventionally used solely for ground-based operations, such as system check-out and pre-launch operations. Once established, the electrical connection formed by the servicer umbilical may be used for any number of purposes, to include without limitation electrical power transfer, software upgrades such as security upgrades, addition of enhanced intrusion prevention or cyber security measures, addition of redundancy to the client such as by providing a redundant telemetry, tracking and control (TT & C) subsystem, client software maintenance or repair, etc. In one embodiment, the servicer umbilical is disconnected from the client spacecraft and furled to its original position on the servicer spacecraft after servicing is completed. In another embodiment, the servicer umbilical remains connected to the client spacecraft after servicing is completed. In another embodiment, a service package is attached to an umbilical connector of the client spacecraft and remains with client spacecraft after the servicing spacecraft undocks from the client spacecraft. The service package may provide without limitation a stand-alone power source, a redundant sub-system such as for command and control, etc.

The disclosed devices, systems, and methods of use will be described with reference to FIGS. 1-9.

Figure 7:
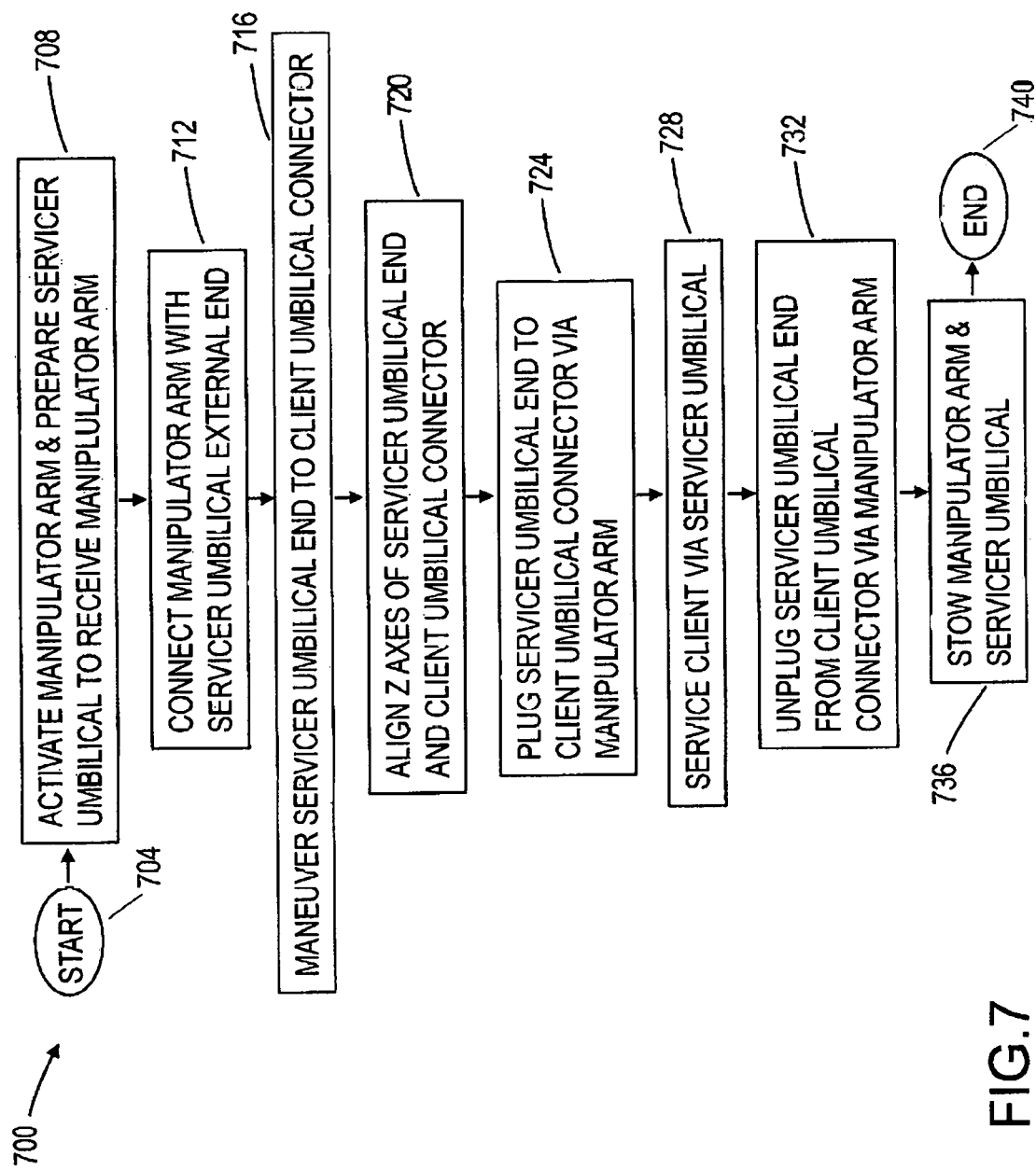
FIG. 7 is a flow diagram of a method of use of the operation of the manipulator arm and the servicer umbilical end during plug, service, and unplug operations.
Figure 8:
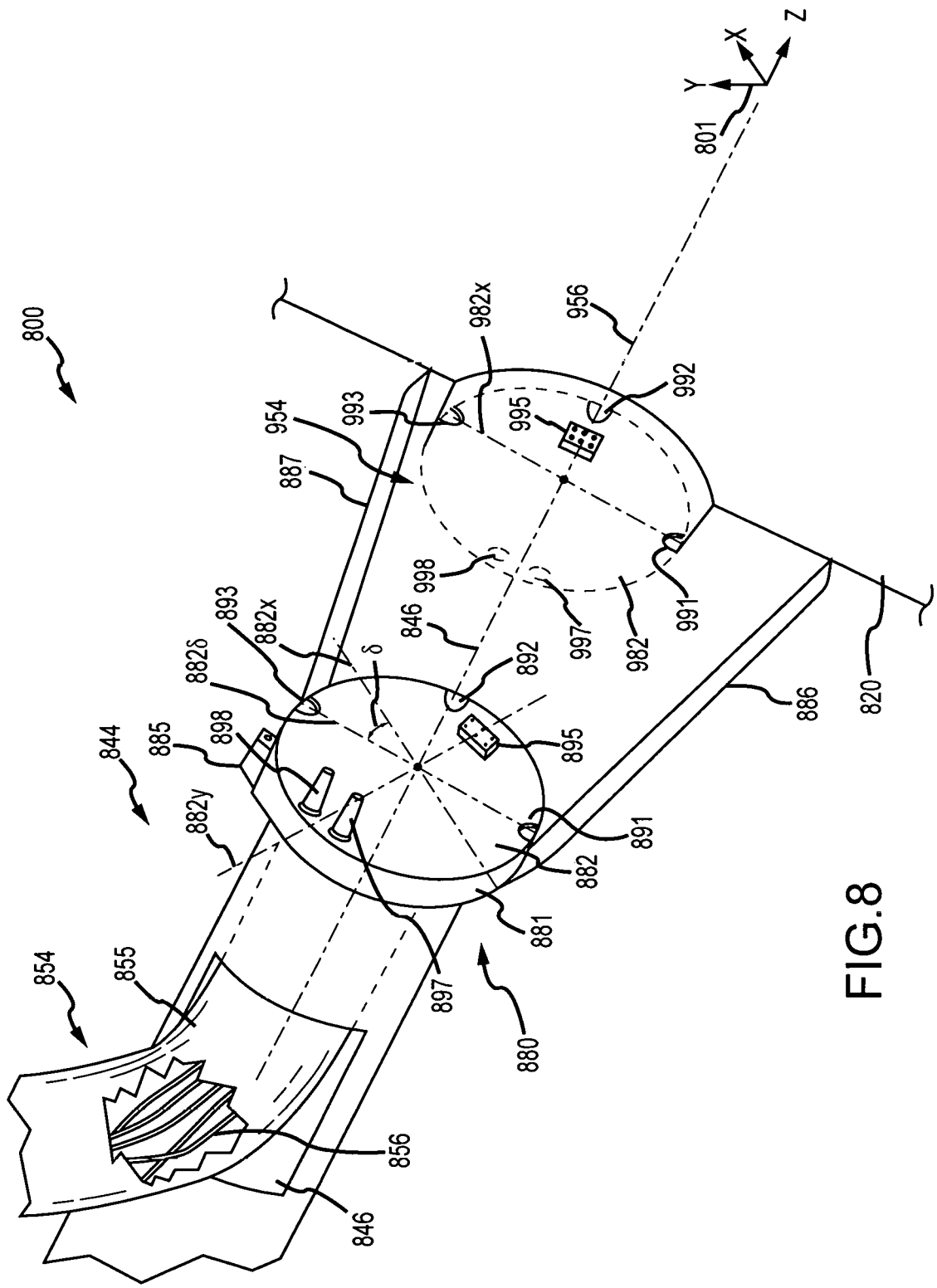
FIG. 8 is a close-up perspective view of the client spacecraft end connector as the joined ends of the servicer spacecraft manipulator arm and the servicer spacecraft servicer umbilical approach to form a connection during precise control operations.
Figure 9:
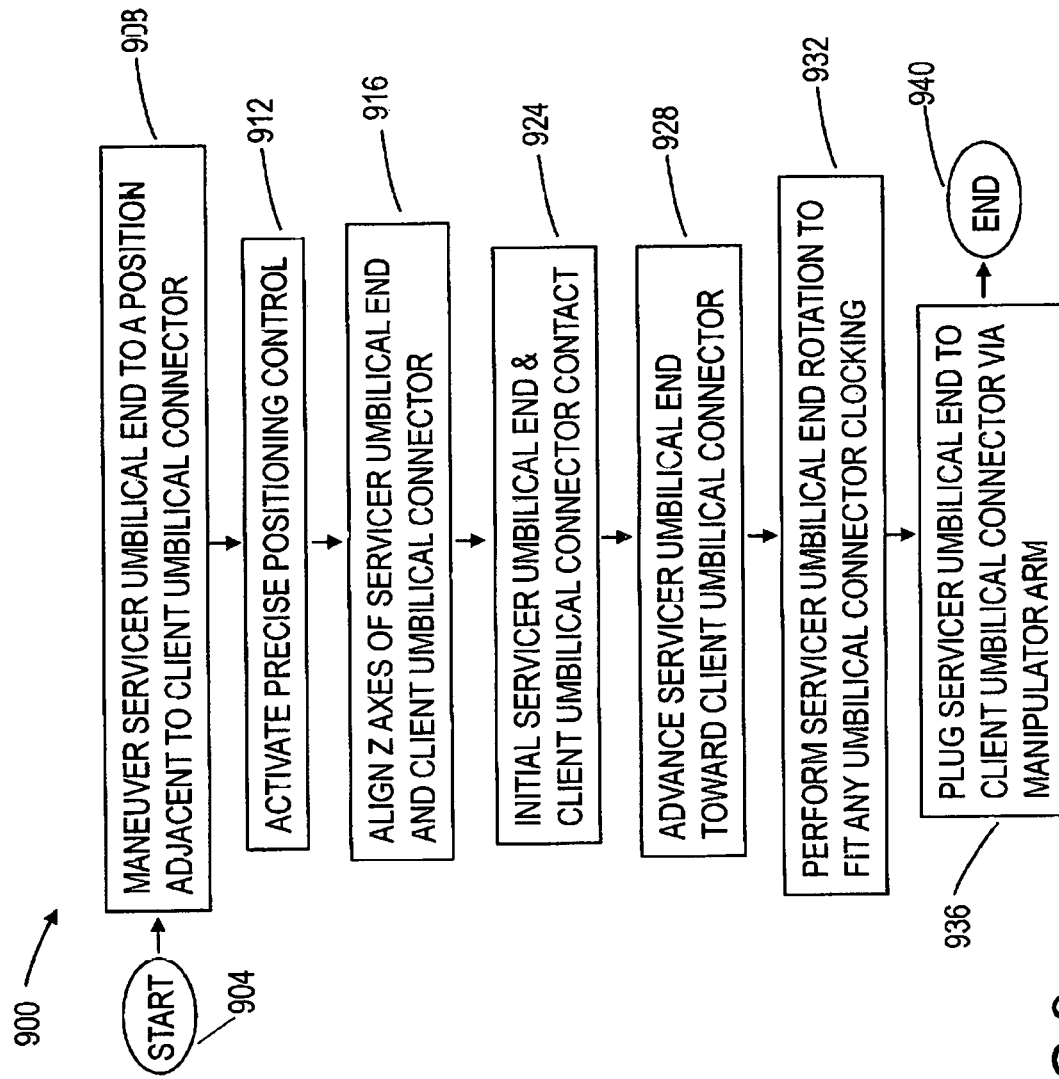
FIG. 9 is flow diagram of a method of use of the operation of the manipulator arm and the servicer umbilical end during precise control operations near the client umbilical connector.

FIGS. 1-3 and 5 provide representations of an entire in-orbit spacecraft servicing system (also referred to as "spacecraft servicing system," "client spacecraft servicing system," "servicing system," or simply as "system"). FIGS. 6 and 8 provide representations of portions of an in-orbit spacecraft servicing system. FIGS. 4A-B provide a sequence of operations or method of use of an entire in-orbit spacecraft servicing system mission (also referred to as "spacecraft servicing system method," "client spacecraft servicing system method," "servicing system method," or simply as "method"). FIGS. 7 and 9 provide a sequence of operations or method of use of portions of the method of use of FIGS. 4A-B in greater detail than provided in FIGS. 4A-B.

With attention to FIGS. 1A-B, perspective views of one embodiment of an in-orbit spacecraft servicing system 100 are depicted. The in-orbit spacecraft servicing system 100 is shown with servicer spacecraft 110 (also referred to as servicer 110) engaged with or docked with client spacecraft 10 (also referred to as client 10).

The term "engage" and the phrase "engaged with" means to be connected with or to connect with, to include, for example, docking with. The term "dock" and the phrase "docking with" mean to join two separate free-flying space objects, typically including latching or otherwise coupling the two objects by way of a docking connector. A "soft docking" is a docking that does not form a rigid connection between the space objects; a "hard docking" forms a rigid connection between the space objects.

Servicer spacecraft 110 forms a hard docking connection with client 10 by way of a set of capture arms 130, the capture arms 130 engaging interface ring 30. The interface ring 30 is commonly of a standardized configuration, e.g. of known diameter and of known edge geometry to facilitate docking operations. In other embodiments, the capture arms 130 engage with any available structurally stable component or area of the client body 20.

In the configuration shown in FIGS. 1A-B, the interface ring 30 is centered about the client z axis 21 of the client body 20, and the engaged or docked client 10 and servicer 110 are aligned about a common z axis 21, 121. Stated another way, the servicer z axis 121 is substantially co-axial or substantially common with the client z axis 21. The phrase "substantially co-axial" and "substantially common" means to a selectable and defined tolerance or deviation. The docking of the servicer 110 with the client 10 via the set of capture arms 130 may be facilitated by geometries or configurations of the capture arms 130, such as the ends of the capture arms 130, as described in U.S. Pat. No. 10,611, 504 to Halsband et al, incorporated by reference in entity for all purposes.

Frame of reference of the in-orbit spacecraft servicing system 100, illustrating the common servicer z axis 121 and client z axis 21, is provided as system frame of reference 101. The z axis points toward Earth (nadir). As such, the servicer 110 is operating at a slightly higher orbit than the client 10.

The client spacecraft 10 comprises a client body 20, at least one client umbilical connector 40 disposed on or coupled to a surface of the client body 20, and an interface ring 30. The servicer spacecraft 110 comprises a servicer body 120, a set of capture arms 130, and an integrated or combined manipulator arm 140 and servicer umbilical 150. (In other embodiments, such as described in FIGS. 6A-D, the manipulator arm 140 and servicer umbilical 150 are separate elements). In some embodiments, the client spacecraft 10 comprises more than one client umbilical connector 40, and/or the servicer spacecraft 110 comprises more than one manipulator arm 40.

Figure 1:
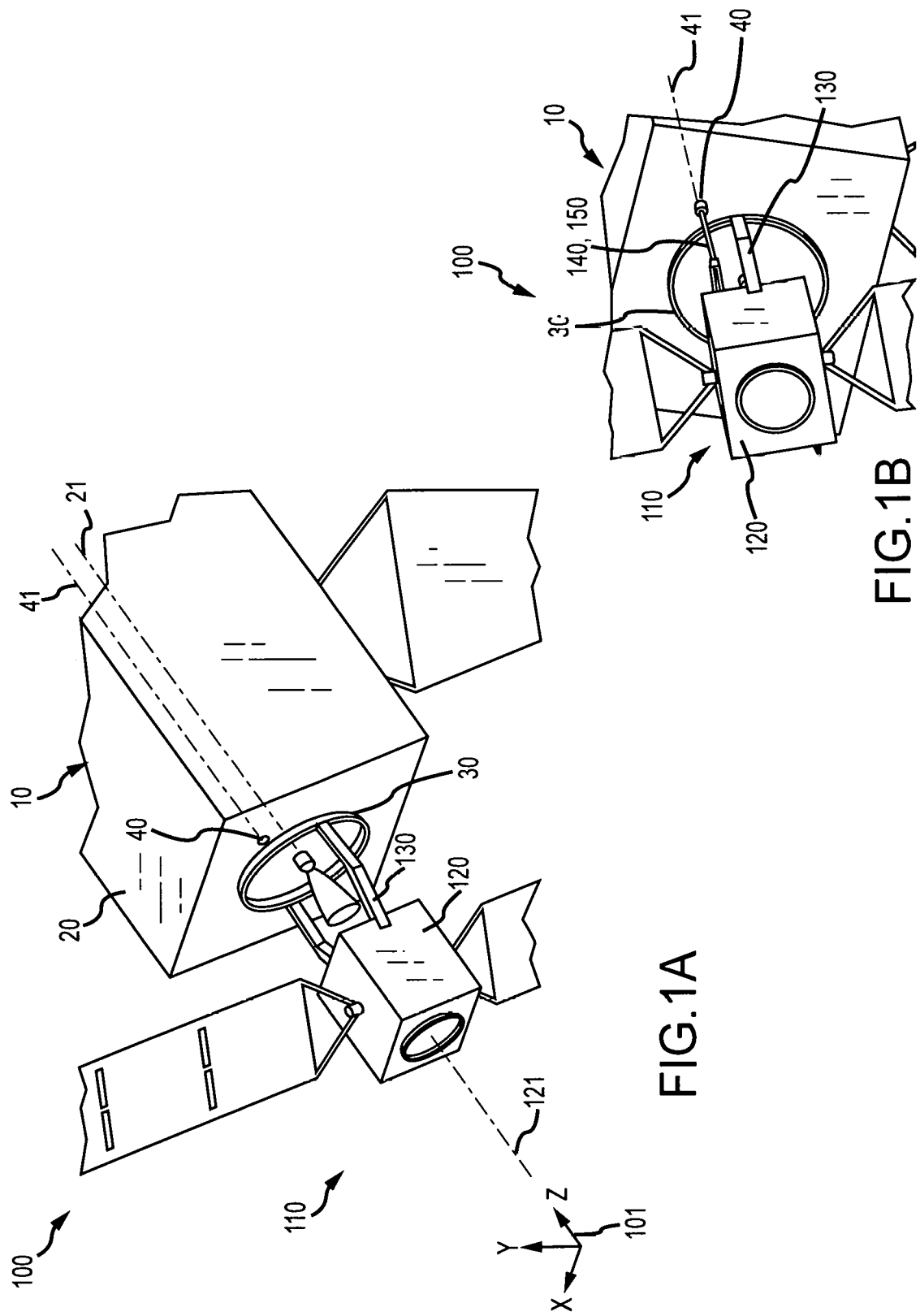
FIG. 1A is a perspective view representation of one embodiment of an in-orbit spacecraft servicing system of the disclosure, the embodiment showing a servicer spacecraft docked with a client spacecraft.
FIG. 1B is a close-up perspective view of the embodiment of an in-orbit spacecraft servicing system of FIG. 1A.

The set of capture arms 130 extend from the servicer body 120 of servicer 110 to engage the interface ring 30 (and/or other structurally stable portion of the client body 20) and form a rigid or hard docked pair of spacecraft. In the configuration of FIG. 1, the servicer 100 comprises two capture arms 130. Other configurations of capture arms include, e.g., three or four (see FIG. 2) capture arms 130.

As briefly mentioned above, in some embodiments the set of capture arms 130 engage with other than an interface ring of the client 10, such as by way of one or more extensions or protrusions of the client body 20, one or more edges of the client body 20, and other means known to those skilled in the art. In one embodiment, the servicer 110 and the client 10 dock by way of a plate-like body as described in U.S. Pat. Appl. No. 2018/0229865 to Maeda et al, incorporated by reference in entirety for all purposes. In one embodiment, the set of capture arms engage with existing or evolving standardized docking components, to include the NASA Low Impact Docking system (LIDs), and/or docking components adapted from existing components, such the Hubble Space Telescope Soft Capture mechanism (SCM).

After docking, the integrated or combined manipulator arm 140 and servicer umbilical 150 maneuver to engage with or plug into the umbilical connector 40. The umbilical connector 40 has an umbilical connector z axis 41 which is parallel with each of the servicer z axis 121 and client z axis 21. In order to attempt to engage with or plug into the umbilical connector 40, the servicer umbilical 150 must be, at minimum, substantially aligned in z axis with the umbilical connector 40 and substantially positioned in an x-y plane just in front of or adjacent to the x-y position of the face of the umbilical connector. In some embodiments of the umbilical connector 40, a specific rotational orientation of the servicer umbilical 150 is also required (a so-called clocking orientation). Further details of the positioning and/or rotational alignments of the servicer umbilical 150 with respect to the face of the umbilical connector 40 are provided below with respect to FIGS. 8 and 9.

Once a connection or positive plugging is made between the umbilical connector 40 and the servicer umbilical 150, electrical communications may be performed between the servicer 110 and the client 10 by way of the servicer umbilical 150.

FIG. 5 is a perspective view representation of another embodiment of an in-orbit spacecraft servicing system 500, the embodiment very similar to the spacecraft servicing system 100 of FIGS. 1A-B except that the servicer spacecraft 510 has two manipulator arms 144, 144' and some details of the client spacecraft 10 have been removed for clarity (e.g. the rocket engine nozzle).

The in-orbit spacecraft servicing system 500 is shown with servicer spacecraft 510 engaged with or docked with client spacecraft 10. The client spacecraft 10 has client body 20, interface ring 30, and client umbilical connector 40.

As depicted in FIG. 5, the servicer spacecraft 510 has servicer body 520, a set of two capture arms 130, and a set of two manipulator arms 140, 140'. The set of capture arms 130 engage or couple to the interface ring 30 to provide a hard docking of the client 10 and servicer 110. Each of the two manipulator arms 140, 140' comprise an integrated servicer umbilical (meaning each of manipulator arms 140 and 140' comprise a servicer umbilical 150). Manipulator arm 140' is depicted in a stowed state or stowed configuration at a position approximately 180 rotational degrees from manipulator arm 140. Manipulator arm 140 has manipulator arm first end 143 and manipulator arm second end 144. Manipulator arm first end 143 is attached to or coupled to the body 520 of service spacecraft 510. Manipulator arm second end 144 is configured to present the end of servicer umbilical to allow electrical connection with client umbilical connector 40 (to be discussed in detail below, e.g. see FIG. 8). Each manipulator arm 140, 140' comprises a first end attached to the servicer body 520 and a second end configured to attach to and to maneuver a servicer umbilical to a position adjacent to a client umbilical connector 40 and to plug the servicer umbilical into the client umbilical connector 40. Each manipulator arm 140, 140' is attached to any available structurally sound location on the servicer body 520.

Figure 2:
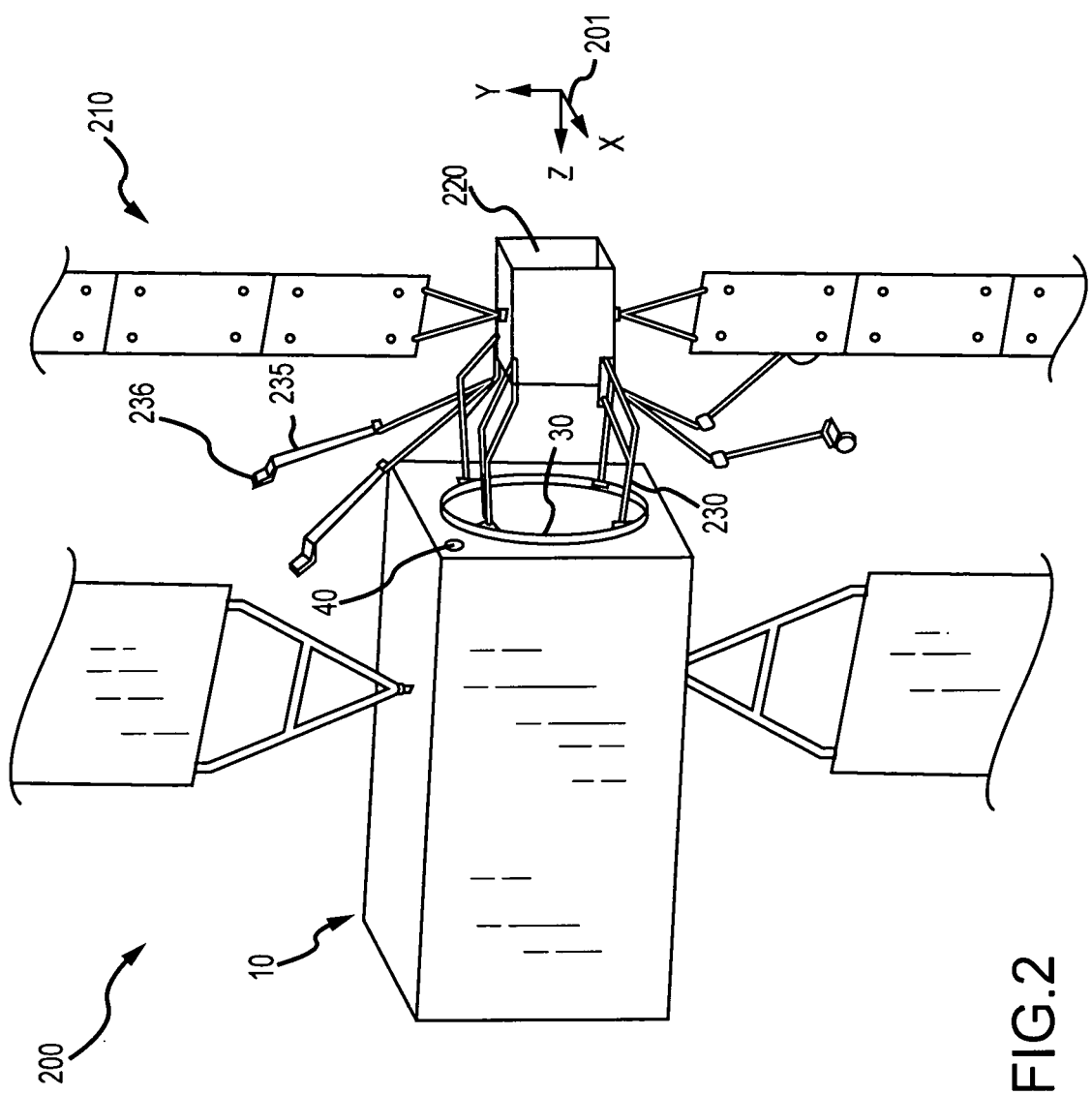
FIG. 2 is a perspective view representation of another embodiment of an in-orbit spacecraft servicing system of the disclosure, the embodiment showing a servicer spacecraft docked with a client spacecraft.

FIG. 2 provides a perspective view representation of another embodiment of an in-orbit spacecraft servicing system 200. The spacecraft servicing system 200 of FIG. 2 is similar to the spacecraft servicing system 100 of FIG. 1 and is adapted from U.S. Pat. No. 10,625,882 to Reitman et al, incorporated by reference for all purposes.

With attention to FIG. 2, a perspective view of a servicer spacecraft 210 engaged with or docked with a client spacecraft 10 is depicted. The two spacecraft are docked such that a common z axis is shared, as depicted with reference to coordinate frame 201.

Client spacecraft 10 comprises client body 20, a pair of solar arrays, client umbilical connector 40, and interface ring 30. Each of the client umbilical connector 40 and the interface ring 30 are disposed on a surface of the body 20 facing the servicer spacecraft 210. The client umbilical connector 40 is disposed at approximately a −45 degree rotational position from the y axis of coordinate frame 201. Note that other positions of a client umbilical connector are possible, to include without limitation 90, 180, and 270 rotational positions (with respect to the z axis) from the depicted client umbilical connector 40, and any intermediate angle. Also, a client 10 may comprise more than one umbilical connector 40 (as shown, for example, in FIG. 5).

Servicer spacecraft 210 comprises a body 220, a pair of solar arrays, a set of four capture arms 230, and a set of four thruster arms 235 each with respective thrusters 236. The thruster arms 235 with respective thrusters 236 provide, among other things, thrust and momentum control of the combined servicer/client spacecraft system.

Figure 3:
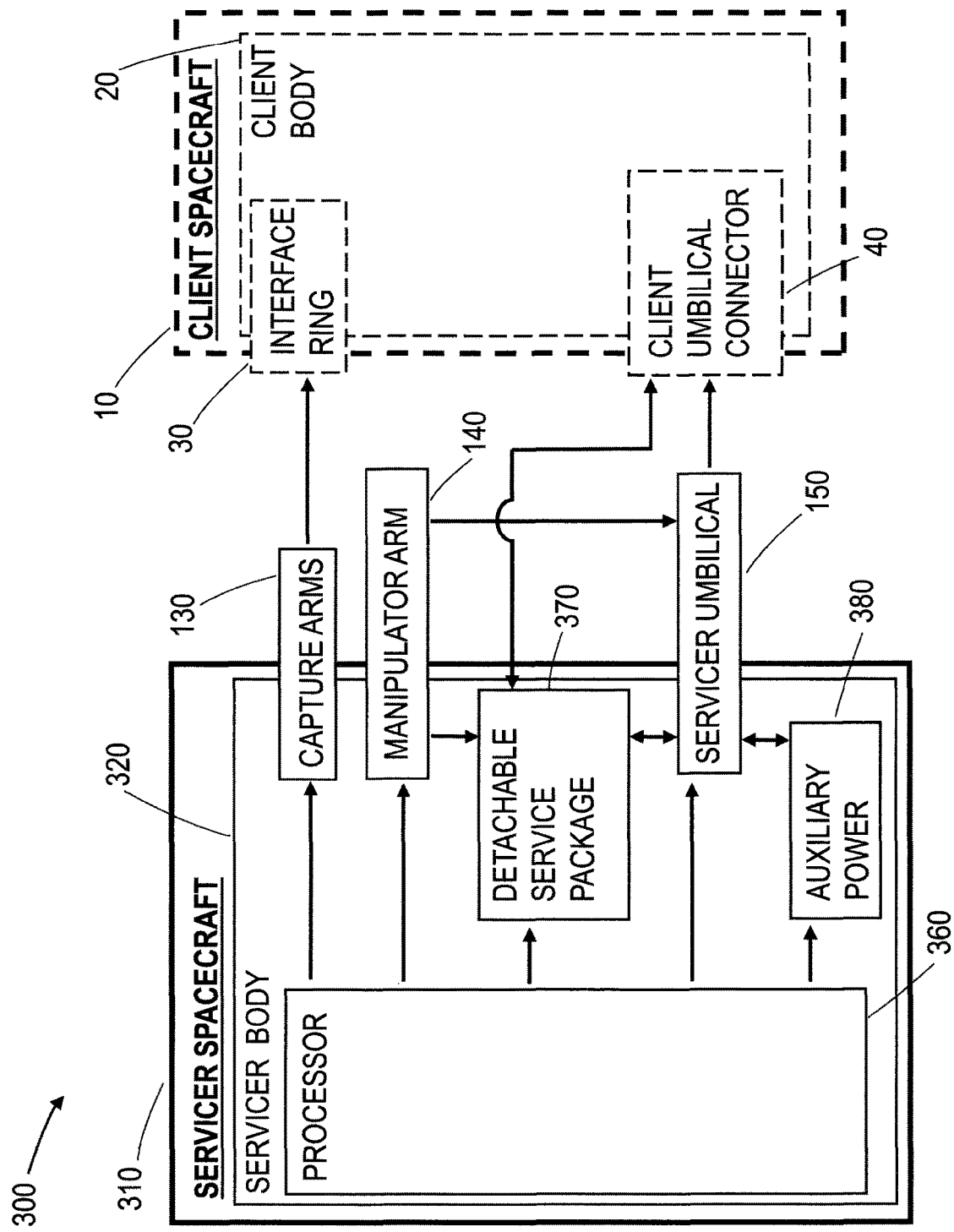
FIG. 3 is block diagram representation of another embodiment of an in-orbit spacecraft servicing system.
Figure 4A:
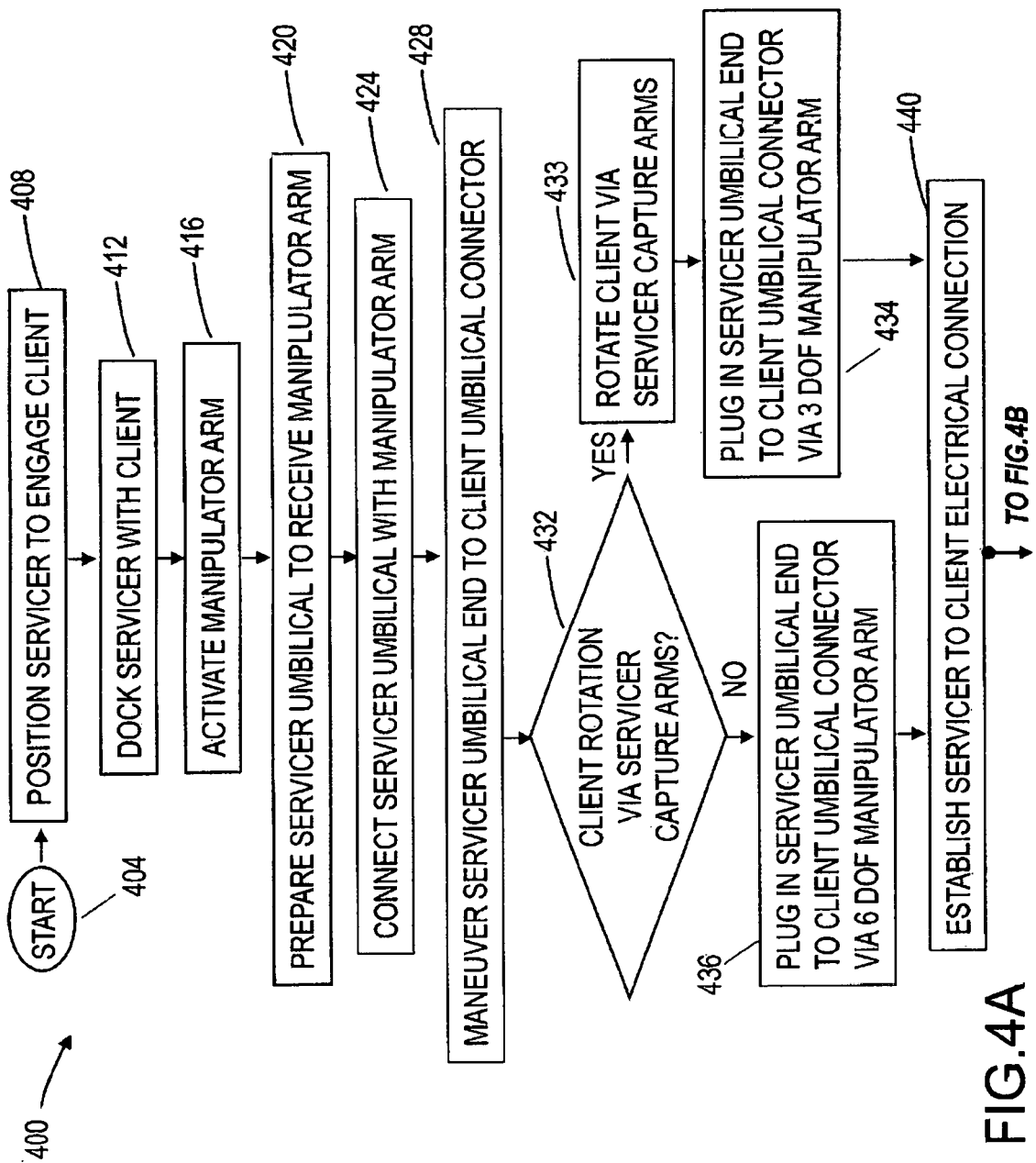
FIG. 4A is part one of two parts of a flow diagram of a method of use of the embodiment of an in-orbit spacecraft servicing system of FIG. 3.
Figure 4B:
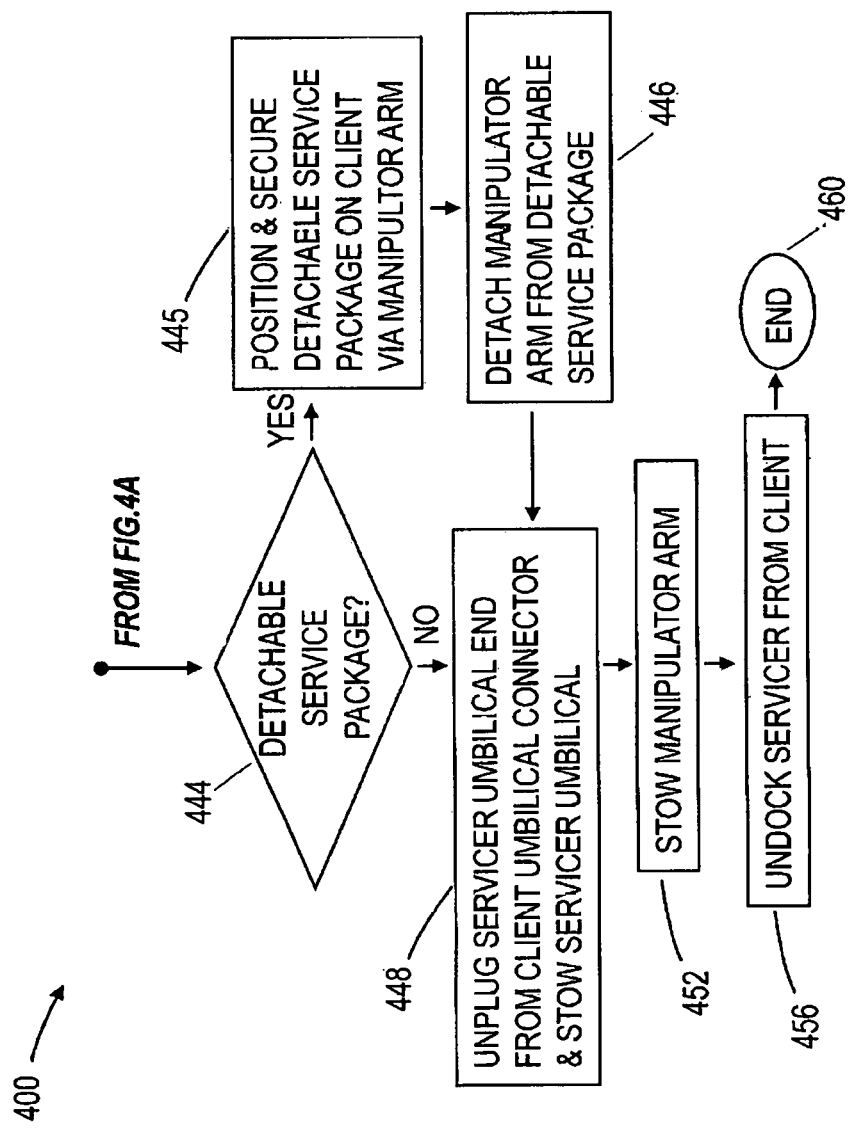
FIG. 4B is part two of two parts of a flow diagram of a method of use of the embodiment of an in-orbit spacecraft servicing system of FIG. 3.

FIG. 3 is block diagram representation of another embodiment of an in-orbit spacecraft servicing system 300, the spacecraft servicing system 300 similar to the respective spacecraft servicing systems 100, 200, 500 of FIGS. 1A-B, 2, and 5 with the addition of several components or elements. Client spacecraft 10 comprises client body 20, interface ring 30, and client umbilical connector 40.

The servicer spacecraft 310 comprises body 320, a set a capture arms 130, a manipulator arm 140, and a servicer umbilical 150. Also, the servicer spacecraft 310 comprises a servicer body 320, capture arms 130, manipulator arm 140, servicer umbilical 150, processor 360, auxiliary power 380, and detachable service package 370.

The processor 320 provides control and management of the components of the servicer spacecraft 310 that enable the servicing of the client spacecraft 10 by way of the servicer umbilical 150. Specifically, the processor 320 controls or operates the manipulator arm 140 in maneuvering the servicer umbilical 150 to engage with or plug into the client umbilical connector 40, such that electric communication (e.g. power transfer, signal transfer, etc.) may be provided between the servicer 310 and the client 10. FIGS. 4A-B provide details of such operation and control of the manipulator arm 140 and servicer umbilical 150. The processor 360 controls the set of capture arms 130. In some embodiments, the operation of the capture arms 130 is controlled partially or completely by another processor of the servicer spacecraft (not shown). In one embodiment, the processor 320 does not control the capture arms 130. In one embodiment, the processor 320 controls the manipulator arm 140, detachable service package 370, auxiliary power 380, and/or the servicer umbilical 150. The processor 320 may operate in any number of control modes for one or more components. For example, the processor 320 may operate the manipulator arm 140 in a first positioning mode that positions an attached servicer umbilical 150 to adjacent a client umbilical connector 40, and a second precise positioning mode that performs plugging in or plugging out maneuvers of the servicer umbilical 150 with the client umbilical connector 40 (see e.g. FIGS. 8-9 for additional details).

The servicer spacecraft 310 also includes an auxiliary power supply 380 which may be used to supply electrical power to the client 10 by way of the servicer umbilical 150 when the servicer umbilical 150 is connected to or plugged into the client umbilical connector 40. Alternatively, or additionally, a main or primary power supply (not shown) of the servicer spacecraft 310 may be used to supply power to the client through the servicer umbilical 150. Such a main power supply and the auxiliary power supply 380 may be operated in a coordinated manner by way of the processor 360. For example, the servicer spacecraft's main power supply may only provide power to the client 10 when the main power supply is not being used, or drawn from, to operate servicer devices such as (electric) thrusters 236, the processor 380 otherwise providing power to the client 10 using the auxiliary power supply 380. Also, one or both of the main power supply and the auxiliary power supply may, through control of the processor 320, withdraw electrical power from the client in addition to delivering electrical power to the client.

A detachable service package 370 is attached to or affixed to the client spacecraft 10 to provide servicing to the client 10 after undocking of the servicer spacecraft 310. The detachable service package 370 may provide any number of functions, to include electrical power, redundancy functions (e.g. back-up command and control, back-up communications, additional or redundant telemetry, tracking and control subsystems), upgrade features (e.g. enhanced security features such as cyber security or protection features), and the like. The detachable service package 370 may be designed to enable or perform client-specific functions, e.g. execute a trouble-shooting protocol for an errant hardware or software module. The detachable service package 370 may remain attached to and/or electrically connected with the client 10 after the servicer 310 undocks from the client 10. The detachable service package 370 is positioned to engage with, and in some embodiments attach to, the client 10 by way of the manipulator arm 140.

In one embodiment, the detachable service package 370 is electrically connected to the servicer at a first end of the service package 370 and is electrically connected to the client 10 at a second end of the service package 370 through a client umbilical connector 40. In some embodiments, one or more servicer umbilicals 150 attach or connect with the service package 370 at one or both of the first end of the service package 370 and the second end of service package 370. In one embodiment, the service package 370 directly connects with the client umbilical connector 40. In one embodiment, the service package 370 connects with the client umbilical connector 40 without use of or connection to a servicer umbilical 150. Operation of the detachable service package 370 is described in more detail with regard to FIGS. 4A-B.

FIGS. 4A-B provide a flow diagram of one method of use 400 of the embodiment of an in-orbit spacecraft servicing system 300 of FIG. 3. However, aspects and features of any of the FIGS. 1, 2 and 4-9 may be referenced to enhance the disclosure of the method of use. For example, elements described in FIGS. 6A-D will be referenced during the description of several steps of the method 400. Generally, the method 400 starts at step 404 and ends at step 460. Any of the steps, functions, and operations discussed herein can be performed continuously and automatically. In some embodiments, one or more of the steps of the method of use 400, to include steps of the method 400, may comprise computer control, use of computer processors, and/or some level of automation. Indeed, most if not all of the steps of method 400 are performed automatically, principally if not entirely by processor 320. However, in some embodiments some of the steps or parts of some of the steps are performed in concert with or exclusively by human intervention. For example, once an electrical connection is established between servicer spacecraft 310 and client spacecraft 10 at step 440, a human operator may intervene to direct specific software to be uploaded to the client spacecraft 10, as discussed below.

The steps are notionally followed in increasing numerical sequence, although, in some embodiments, some steps may be omitted, some steps added, and the steps may follow other than increasing numerical order. A user may interact or perform one or more of the described steps be using a display/GUI. The phrase "user interface" or "UI", and the phrase "graphical user interface" or "GUI", means a computer-based display that allows interaction with a user with aid of images or graphics.

After starting at step 404, the method 400 proceeds to step 408. At step 408, the servicer spacecraft 310 positions to engage or dock with the client spacecraft 10. The client spacecraft may be in any of a number of orbit types, to include Geostationary Earth Orbit (GEO), Low Earth Orbit (LEO), Medium Earth orbit (MEO), interplanetary transfer orbits, Earth-Moon Lagrange points, and any stable orbit configuration. In one embodiment, the client spacecraft is a client satellite, such as a communication satellite. In one embodiment, the client satellite operates at one of GEO or LEO. The client spacecraft may be operating in a stable configuration or an uncontrolled configuration. In either client configuration, at step 408, the servicer spacecraft 310 is positioned so as to face the client spacecraft 10 without relative motion between the two spacecraft, thus enabling docking of the two spacecraft. Stated another way, at step 408, the servicer 310 is positioned such that capture arms 130 face the interface ring 30 and the client umbilical connector 40 of the client 10, such that the capture arms 130 may extend to dock with the client 10. In one embodiment, the client 10 is a tumbling (aka uncontrolled) spacecraft, and the positioning of the servicer 310 relative to the client 10 is as described in *ELSA-D: An In-orbit End-of-Life Demonstration Mission*, Blackerby et al, IAC-18, Sep. 14, 2018, incorporated by reference in entirety for all purposes. At the completion of step 408, the method 400 proceeds to step 412.

At step 412, the servicer spacecraft 310 docks with the client spacecraft 10 using the set of capture arms 130. The capture arms 310 may be controlled exclusively by the processor 320, exclusively by a core or servicer body processor other than the processor 320, or a combination of both. The capture arms 130 may engage an interface ring 30 of the client 10, and/or may engage a component or portion of the client 10 other than a client interface ring 30. In one embodiment, the set of capture arms 30 engage and dock with one or more physical extensions of the body 20 of the client 10. At the completion of step 412, the method 400 proceeds to step 416.

At step 416, the processor 320 activates the manipulator arm (or set of manipulator arms, such as in the system 500 of FIG. 5 wherein the servicer 510 has two manipulator arms). The activation may involve diagnostic, health, and/or system checks to ensure proper operation of the manipulator arm 640 (See FIG. 6A-D for three-digit elements beginning with a 6). The manipulator 640 may have an initial or stowed configuration when the servicer 310 first docks with a client 10, such as depicted in FIG. 6A. At the completion of step 416, the method 400 proceeds to step 420.

At step 420, the servicer umbilical 650 is prepared to receive the manipulator arm 640. More specifically, the umbilical arm 650 is prepared to receive the manipulator arm second end 644, the manipulator arm second end 644 being opposite to the manipulator arm first end 643. The manipulator arm first end 643 is attached to the body 620 of the servicer 610. The preparation of the servicer umbilical 650 may include detaching the servicer umbilical second end 654 from engagement with the body 620 of the client 610, such as detachment from a servicer cavity 671 of the body 620 of the servicer 610. The preparation of the servicer umbilical 650 may also include diagnostic, health, and/or system checks of the servicer umbilical 650. In one embodiment, the servicer umbilical 650 initial stowed configuration may be a coiled configuration, as shown in FIG. 6A. At the completion of step 420, the method 400 proceeds to step 424.

At step 424, the servicer umbilical 650 is connected with the manipulator arm 640. More specifically, the manipulator arm second end 644 is connected with the servicer umbilical second end 654 so as to present an external face of the servicer umbilical second end 654 that is able to connect or plug into the client umbilical connector 40. The manipulator arm second end 644 is adapted or configured such that, upon rotation and/or pivoting, the formerly internally facing end of the servicer umbilical second end 654 is rotated to face outwards (compare the relative positioning of manipulator arm second end 644 and servicer umbilical second end 654 in FIG. 6B and FIG. 6C). In one embodiment, the interaction or engagement of the servicer umbilical second end 654 and the servicer umbilical second end 654 uses techniques or elements described in WIPO Application WO 2019/068547 to Schadler et al, incorporated by reference for all purposes. The final configuration of the joined or connected pair of manipulator arm second end 644 and servicer umbilical second end 654 is described with respect to FIG. 8. (Note that in some configurations, such as that depicted in FIGS. 1B and 5, the manipulator arm and servicer umbilical are an integrated unit, thereby obviating the need for step 424). At the completion of step 424, the method 400 proceeds to step 428.

At step 428, the processor 360 directs or controls the manipulator arm 140, with attached servicer umbilical second end 654, to a position adjacent or near the client umbilical connector 40, as shown in FIGS. 6C-D. The processor 360, as briefly discussed above, may operate in a set of control modes when controlling or maneuvering the manipulator arm 140. The set of control modes may receive a variety of sensor inputs to perform the control modes. For example, the processor 360 may initially operate or control the manipulator arm 140 in a first positioning mode with aid of sensor data provided by one or more sensors mounted on the servicer body 320, such as a wide field of view camera. In another example, the processor 320 may control the manipulator arm with aid of one or more sensors mounted on the manipulator arm 140, such as at or near the manipulator arm second end 644, and/or mounted on or near the servicer umbilical second end 654, such as a radar or micro camera (see FIG. 8).

The processor 360 may combine available sensors to position and maneuver the manipulator arm 140 in any number of control modes in any number of control law schemes known to those skilled in the art, to include adaptive control, stochastic control, neural network, AI-based or other machine learning control, etc. The processor 360 may employ techniques of computer vision to assist or enable control of the manipulator arm 140. The manipulator arm may operate autonomously, semi-autonomously, or manually during all or portions of operation. (Manual input provided by a ground-based operator communicating with the processor 360 by way of ground-based command entries). At the completion of step 428, the method 400 proceeds to step 432.

In one embodiment, the processor monitors the kinematics of the manipulator arm 140 through postures of the joints or pivots of the manipular arm 140 and/or the posture of the manipulator arm second end 644 to control the motion of the manipulator arm 140. In such an embodiment, with knowledge of the geometries of the client spacecraft (e.g. the location of the targeted client umbilical connector and any obstacles the manipulator arm may encounter when maneuvering to the umbilical connector), the manipulator arm second end 644 with attached servicer umbilical may maneuver the servicer umbilical to a position near or adjacent the umbilical connector, if not plug the servicer umbilical into the umbilical connector.

At step 432, a query is made as to whether a rotation of the client spacecraft 10 about interface ring 30 is available and to be employed, such rotation performed by the set of capture arms 130. Such a capability allows selectable relative positioning between the client umbilical connector 40 and the manipulator arm second end 644 (and thus also the coupled servicer umbilical second end 654), and thereby reduces the degrees of freedom (DOF) required of the manipulator arm. Stated another way, if a rotation of the client spacecraft 10 about interface ring 30 is available, the degrees of freedom required to enable the connection between the servicer umbilical second end 654 and the client umbilical connector 40 may be shared between the manipulator arm 640 and the connection between the client 10 and the servicer 110. For example, if the servicer 310 is docked to the client 10 through the client interface ring 30 in such a way that the client 10 is in a predetermined orientation relative to the servicer 310, and the servicer 110 can furthermore rotate around the interface ring 30 and clamp to it in any required clocking, than only three degrees of freedom are required for the manipulator arm 140, namely radial and axial translations relative to the common body Z-axis (121 and 21 of FIG. 1A) of the tandem or paired spacecraft system in order to bring the servicer umbilical second end 654 along the plugging axis (41, 646, and 656 of FIG. 6D), and a rotation of the servicer umbilical second end 654 to orient the correctly around the plugging axis. (Among other things, a reduced DOF manipulator arm may offer advantages relative to a higher DOF manipular arm such as reduced cost, reduced stowage space requirements, reduced power requirements, increased reliability, etc.)

If the response to the query of step 432 is Yes, then the method 400 proceeds to step 433 wherein the client 10 is rotated or captured in the manner described above so as to reduce the degrees of freedom required of the manipulator arm 140. At the completion of step 433, the method 400 continues to step 434. At step 434, a manipulator arm 140 of reduced degree of freedom, as described, may be used, such as a manipulator arm 140 of three DOF, to plug the servicer umbilical second end 654 to the client umbilical connector 40. Additional details of the plugging of the servicer umbilical second end 654 with to the client umbilical connector 40 are provided in FIGS. 7-9. At step 434, a manipulator arm 140 of at least 3 DOF may also be used, to include a manipulator arm of six DOF. At the completion of step 434, the method 400 proceeds to step 440.

If the response to the query of step 432 is No, then the method proceeds to step 436, wherein a six DOF manipulator arm 140 is used to plug the servicer umbilical second end 654 to the client umbilical connector 40. Additional details of the plugging of the servicer umbilical second end 654 with to the client umbilical connector 40 are provided in FIGS. 7-9. At the completion of step 436, the method 400 proceeds to step 440.

At step 440, a connection between the servicer spacecraft 310 and the client spacecraft 10 is established. More specifically, a physical connection and/or an electrical connection is made between the servicer umbilical second end 654 and the client umbilical connector 40. The electrical connection allows any number of servicing functions to be performed to the client 10 by the servicer 310. For example, the auxiliary power 380 may provide, as controlled by the processor 320, electrical power to the client 10. As another example, electrical signals may be transferred to perform status or maintenance functions, e.g. perform diagnostics on the client. As another example, the electrical connection may be used to add or enhance cyber protection through the servicer 310 to the client 10, and/or to add redundancy to the client 10, such as by providing a redundant telemetry, tracking and control (TT & C) subsystem to the client 10. The electrical connection between the servicer 310 and the client 10 may be used for communications in either or both directions, e.g. diagnostic or status data may be transferred from the client 10 to the servicer 310, a client data back-up may be performed by data transfer from the client 10 to the servicer 310, and software upgrade routines may be transferred from the servicer 310 to the client 10. At the completion of step 440, the method 400 proceeds to step 444.

At step 444, a query is made as to whether the servicer spacecraft 310 has a detachable service package 370, the detachable 370 to be affixed or coupled to the client spacecraft 10. If the reply to the query of step 444 is Yes, the method 400 proceeds to step 445 wherein the detachable service package 370 is detached from the servicer 310 by the manipulator arm 140 and positioned and secured to a selectable location on or in the client 10. As discussed above, the detachable service package 370 may be configured to connect with one or more client umbilical connectors 40 of the client 10, either directly or by way of a servicer umbilical 150. After completion of step 445, the method 400 proceeds to step 446, wherein the manipulator arm 140 detaches from the service package 370. At the completion of step 446, the method 400 proceeds to step 448. If the reply to the query of step 444 is No, the method 400 proceeds to step 448.

At step 448 the servicer umbilical second end 654 is detached or unplugged from the client umbilical connector 40 and the servicer umbilical 40 is stowed in or on the servicer spacecraft 310. Generally, the unplugging of the servicer umbilical second end 654 from the client umbilical connector 40 proceeds in a similar but opposite manner to the plugging, e.g. the servicer umbilical second end 654 is rotated in an opposite angular direction along plugging z axis 41 to that required during plugging and the servicer umbilical second end 654 is retraced or pulled away from the client umbilical connector 40. In one embodiment, the servicer umbilical 40 is stowed in a configuration similar to the initial stowed position of FIG. 6A. At the completion of step 448, the method 400 proceeds to step 452.

At step 452, the manipulator arm 140 is stowed on or within the servicer spacecraft 310. In one embodiment, the manipulator arm 140 is stowed in a configuration similar to the initial stowed position of FIG. 6A. At the completion of step 452, the method 400 proceeds to step 456.

At step 456, the servicer spacecraft 310 undocks from the client spacecraft 10, and the method 400 proceeds to step 460 wherein the method ends.

FIGS. 6A-D provide a sequence of close-up top views of another embodiment of an in-orbit spacecraft servicing system 600. The embodiment comprises a servicer spacecraft 610 comprising a servicer body 620, a single manipulator arm 640 and a single servicer umbilical 650 stowed within a servicer cavity 671, and a client 10 with a single umbilical connector 40 disposed on client body 20. The set of FIGS. 6A-D are further described with regards to the method 700 of FIG. 7.

The manipulator 640 comprises a manipulator first end 643 attached to or secured to a servicer manipulator arm attachment 622, the servicer manipulator arm attachment 622 attached to or secured to the servicer body 620. The manipulator arm 640 further comprises a medial portion 645 comprising a set of two pivot joints, and a manipulator second end 644 configured to engage with or couple to the servicer umbilical second end 654. The set of joints of the manipulator arm 640 operate as pivot joints to enable pivoting or rotation between connected or attached components. For example, the pivot associated with manipulator first end 643 enables rotation of the manipulator first end 643 about the servicer manipulator arm attachment 622. Other configurations joints and components of the manipulator arm 640 are possible, to include alternative and/or additional joints than the pivot joints depicted, as known to those skilled in the art.

The manipulator arm 640 is a six DOF manipulator arm and is depicted in a sequence of states or configurations in each of FIGS. 6A-D. Generally, the manipulator arm 640 operates to attach the manipulator second end 644 to the servicer umbilical second end 654 as depicted in FIG. 6B, to maneuver the servicer umbilical second end 654 to a position adjacent the umbilical connector 40 in FIG. 6C (requiring, among other things, a 3-d positioning of the servicer umbilical second end 654 adjacent the umbilical connector 40), to align the servicer umbilical second end 654 in z axis with the plugging z axis 41 of the umbilical connector 40 as depicted in FIG. 6D, and to plug in the servicer umbilical second end 654 with the umbilical connector 40.

The servicer umbilical 650 comprises a servicer umbilical first end 623 attached to or secured to a servicer umbilical attachment 623, the servicer umbilical attachment 623 in turn attached to or secured to the servicer body 620. The servicer umbilical 650 further comprises a servicer umbilical second end 654 configured to engage with or couple to manipulator second end 644. The servicer umbilical 650 is depicted in a sequence of states or configurations in each of FIGS. 6A-D.

In FIG. 6A, the servicer umbilical 650 is depicted in a first (or stowed) servicer umbilical state, wherein the servicer umbilical 650 is stowed internally to the body 620 of the servicer 610 within servicer cavity 671 in a coiled configuration. Other stowed positions or configurations of the servicer umbilical 650 are possible, to include partially or entirely external to the body 620 (not shown), not unlike the manner of stowage of the manipulator arm 640.

FIG. 6B depicts the manipulator arm 640 and the servicer umbilical 650 each in a respective second state, wherein the manipulator second end 644 is engaged with the servicer umbilical second end 654, the servicer umbilical 650 remaining in a coiled state or coiled configuration.

FIG. 6C depicts the manipulator arm 640 and the servicer umbilical 650 each in a respective third state, wherein the manipulator second end 644 is engaged with the servicer umbilical second end 654, the coupled or engaged pair of servicer umbilical second end 654 and manipulator second end 644 moving toward the umbilical connector 40 of client 10. In this third state, the coupled engaged pair of servicer umbilical second end 654 and manipulator second end 644 have an axial relative z axis of 644, 654 and the umbilical connector 40 has a z axis 41 (also referred to as a plugging axis 41).

FIG. 6D depicts the manipulator arm 640 and the servicer umbilical 650 each in a respective fourth state, wherein the manipulator second end 644 remains engaged with the servicer umbilical second end 654, the coupled or engaged pair of servicer umbilical second end 654 and manipulator second end 644 generally aligned with the umbilical connector 40 of client 10. In this fourth state, the coupled engaged pair of servicer umbilical second end 654 and manipulator second end 644 have an axial relative z axis of 644, 654 generally or substantially aligned with the plugging axis 41 of the umbilical connector 40, and the servicer umbilical second end 654 is positioned to plug into the umbilical connector 40 (see FIGS. 7-8 and associated description).

FIG. 7 provides a flow diagram of operations of the manipulator arm and servicer umbilical to plug and unplug with the umbilical connector. The method 700 of FIG. 7 will be described with reference to other figures of the disclosure, in particular FIGS. 3, 4A-B, and 6A-D.

Generally, the method 700 starts at step 704 and ends at step 740. Any of the steps, functions, and operations discussed herein can be performed continuously and automatically. In some embodiments, one or more of the steps of the method of use 700, to include steps of the method 700, may comprise computer control, use of computer processors, and/or some level of automation. Indeed, most if not all of the steps of method 700 are performed automatically, principally if not entirely by processor 320. However, in some embodiments some of the steps or parts of some of the steps are performed in concert with or exclusively with human intervention. For example, once an electrical connection is established between servicer spacecraft 310 and client spacecraft 10 at step 724, a human may intervene to direct specific servicing activities for the client spacecraft 10. The steps are notionally followed in increasing numerical sequence, although, in some embodiments, some steps may be omitted, some steps added, and the steps may follow other than increasing numerical order. When the method references a user, the user may be one or more users. A user may interact or perform one or more of the described steps be using a display/GUI.

After starting at step 704, the method 700 proceeds to step 708. At step 708, the manipulator arm 140 is activated and the servicer umbilical 150 is prepared to receive the manipulator arm 140. The step 708 is very similar to the step 416 of method 400 wherein the manipulator arm 140 is unstowed, turned on, and checked for operation, and the step 420 of method 400, wherein the servicer umbilical 150 is unstowed and similarly checked for operation. FIG. 6A depicts the step 708 with respect to a manipulator arm 140 and servicer umbilical 150 of a servicer 610. If one or both of the servicer umbilical 150 and manipulator arm 140 are stowed within a compartment or cavity of the body 320 of the servicer 310, such a compartment is opened to allow the exit and operation of the servicer umbilical 150 and/or manipulator arm 140. After the completion of step 708, the method 700 proceeds to step 712.

At step 712, the manipulator arm second end 644 is connected to the servicer umbilical second end 654, as shown in FIG. 6B. The step 712 is similar to the step 424 of method 400. At step 712, electronics of the manipulator arm 140, such as electronics of the manipulator arm second end 644, may form an electrical connection with the servicer umbilical second end 654. After the completion of step 712, the method 700 proceeds to step 716.

At step 716, the manipulator arm second end 644, as connected to the servicer umbilical second end 654, maneuvers toward the client umbilical connector 40, as shown in FIG. 6C. The step 716 is similar to the step 428 of method 400. During step 716, the servicer umbilical 150 unfurls or uncoils. In one embodiment, during step 716 additional sensors associated with the manipulator arm second end 644 may be activated, such additional sensors enabling precise control of the manipulator arm second end 644 and further described with respect to FIG. 8 below. After the completion of step 716, the method 700 proceeds to step 720.

At step 720, the z axes of the joined or coupled manipulator second end 644 and servicer umbilical second end 654 are substantially aligned with the z axis of the client umbilical connector 41, as depicted in FIG. 6D. Stated another way, the shared manipulator second end 644 z axis 646 and servicer umbilical second end 654 z axis 656 is substantially aligned with the plugging axis 41 of the umbilical connector 40. After the completion of step 720, the method 700 proceeds to step 724.

At step 724, the servicer umbilical second end 654, by way of the maneuvering and control of the manipulator second end 644 by the processor 320, is plugged into the umbilical connector 40 along plugging axis 41. The step 724 is similar to the alternative steps 436 and 434 of method 400. Additional details of the step 724 plugging operations are provided with respect to FIGS. 8 and 9, to include any rotational requirements of the servicer umbilical second end 654 to satisfy clocking requirements of the umbilical connector 40. After the completion of step 724, the method 700 proceeds to step 728.

At step 728, the client spacecraft 10 is serviced as described above. The servicing may comprise transfer of electrical power to client 10 by transfer of electrical energy a stored in auxiliary power 380, and one-way or two-way transfer of electrical signals e.g. transfer software or receive spacecraft data, addition of enhanced intrusion prevention or cyber security measures, addition of redundancy to the client such as by providing a redundant telemetry, tracking and control subsystem, client software maintenance or repair, etc.

During the servicing of the client spacecraft 10 by way of client umbilical connector 40, the manipulator arm 140 may or may not remain engaged with the umbilical connector 40, and specifically may or may not remain engaged with the servicer umbilical second end 654, in embodiments of the system wherein the servicer umbilical second end 654 is configured to remain engaged with, or plugged into, the client umbilical connector 40 without need of the continuous engagement of the manipulator arm 140. Stated another way, in some embodiments the manipulator arm 140 is not required to remain attached to the servicer umbilical during servicing of the client because the servicer umbilical second end 654, once plugged into the client umbilical connector 40, remains securely plugged in without requiring continued connection (e.g. forward pressure along the plugging axis) with the manipulator arm 140. Such an unaided continuous plug-in of the servicer umbilical into the umbilical connector 40 may be enabled by, among other things, geometries of the plug-in (e.g. required clocking and rotation, discussed below), friction or interference fitting of the plug-in, etc. The ability of the servicer umbilical to remain plugged into the umbilical connector 40 without aid of the manipulator arm 140 is advantageous as such a capability enables, among other things, for the manipulator arm to perform other functions during client servicing, such as attaching a service package to the client, attaching a second servicer umbilical to a second umbilical connector, etc. After the completion of step 724, the method 700 proceeds to step 732.

At step 732, the servicer umbilical second end 654 is unplugged or disconnected from the umbilical connector 40 along the plugging axis 41. Step 732 is similar to aspects of step 448 of method 400. In one embodiment wherein the umbilical connector has clocking requirements, the servicer umbilical second end 654 is first rotated by the manipulator arm second end 644 before being axially pulled away or out from the umbilical connector 40. After the completion of step 732, the method 700 proceeds to step 736.

At step 736, the manipulator arm 640 first stows the servicer umbilical 650 to within the cavity 671, requiring furling or curling up of the servicer umbilical 650. Step 736 is similar to aspects of steps 448 and 452 of method 400. In one embodiment, the stowage of the servicer umbilical 650 is facilitated or assisted by a mechanism contained within or adjacent to the cavity 671, such a mechanism optionally controlled by the processor 360. For example, the mechanism may comprise a tether that may be reeled in and out with the extension or unfurling of the servicer umbilical 650, a spring or other retraction mechanism, an electromagnet, etc. After the manipulator arm 640 stows the servicer umbilical 650, the manipulator arm itself is stowed. After completion of step 736, the method 400 proceeds to step 740 and the method 4500 ends.

FIG. 8 depicts a close-up perspective view 800 of the servicer umbilical connector second end 954 and client spacecraft end connector 40 as the joined ends of the servicer spacecraft manipulator arm 140 and the servicer spacecraft servicer umbilical 150 approach the end connector 40 to form a connection.

The manipulator arm second end 844, as engaged with or coupled to the servicer umbilical second end 854, is shown in FIG. 8 approaching the client spacecraft umbilical connector face 982 of servicer umbilical second end 954. Coordinate system 801 shows a plugging axis z aligned for each of these components. Stated another way, umbilical connector z axis 956 is aligned with the common z axis of the connected manipulator arm second end 844 and servicer umbilical second end 854.

Umbilical connector face 982 of umbilical connector second end 954 is depicted extended from body 820 of client spacecraft with a set of three clocking divots 991, 992, and 993. The set of clocking divots or apertures or voids 991, 992, 993 are positioned at 90-degree radial offsets from one another in a symmetrical arrangement. The umbilical connector face 954 also comprises a pair of pin receiver divots 997 and 998, and a rectangular pin port 995. The pair of pin receiver divots 997 are disposed at opposing ends of umbilical connector face x axis 982x.

Other configurations of connections of the umbilical connector face 954 are possible—the version depicted in FIG. 8 is for illustrative purposes only. Any commercially available configuration of connections of the umbilical connector face 954 is possible as known to those skilled in the art. For example, the umbilical connector face 954 and/or the client spacecraft end connector 40 generally may be configured as described in the *Falcon 9 Lunch Payload User's Guide*, Rev. 1, Space Exploration Technologies, 09-S-0347, and/or in the *Ariane 5 User's Manual*, Issue 5 Revision 1, July 23011, Arianespace, both of which are incorporated by reference in entirety for all purposes. In some embodiments of the umbilical connector face 954 and/or the client spacecraft end connector 40, one or more latch devices (either latch receivers or latch extensions) are conventionally used to connect the servicer umbilical with a client umbilical connector when such connection is conventionally made during ground operations. Such latch devices, or other connection mechanisms known to those skilled in the art, may or may not be additionally or alternatively associated with the system of the disclosure.

Servicer umbilical second end face 882 of servicer umbilical second end 854 has an opposing set of connectors to engage with or connect with the umbilical connector face 982. Specifically, servicer umbilical second end face 882 has a set of three closing extensions 891, 892, and 893 (which engage with respective clocking divots 991, 992, and 993), a pair of pins 897 and 898 (which engage with respective pin receiver divots 997 and 998), and a rectangular pin plug 895 (which engages with rectangular pin port 995). The servicer umbilical second end face 882 is fitted within a manipulator arm second end lip 881. The servicer umbilical second end face 882 has a servicer umbilical second end face x axis 882x and a servicer umbilical second end face y axis of 882y, the servicer umbilical second end face 882 offset in rotation by servicer umbilical second end face angle γ.

Manipulator arm second end lip 881 comprises a sensor 885 and a set of extension guides 886, 887 to assist in precise control or positioning of the servicer umbilical second end face 882. Other configurations of sensors and extensions are possible.

In one embodiment, the sensor 885 is a camera, such as a visible band camera, infrared camera, or other camera. The sensor 885 senses or measures sensor data that is provided to the processor 360. The sensor 885 data may comprise, for example, images e.g. as collected from a camera, ranging data e.g. as collected from a radar or lidar, force data as e.g. collected from a force sensor, strain data as collected from a strain gauge, and physical positioning sensor or apparatus (such as the extension guides 886, 887). In one embodiment, the sensor is a micro camera, such as manufactured by Scoutcam™ and/or as described in U.S. Pat. No. 10,420,216 to Govrin et al, incorporated by reference in entirety for all purposes. The sensor 885 may be a set of sensors comprising radar, ladar, lidar, electromagnetic, and other sensors known to those skilled in the art. The one or more sensors 885 provide sensor measurements to the processor to assist in or to enable the control of the servicer umbilical second end face 882 by way of the control of the manipulator arm second.

In some embodiments, additional or alternative sensors may be mounted on one or more of the servicer body or servicer components to assist and/or enable maneuvering of the manipulator arm to adjacent the client umbilical connector and/or through to plugging/unplugging operations. For example, a sensor, such as a wide field of view camera, may be mounted on a surface of the servicer body, e.g. on the surface facing the client umbilical connector, to allow for general or primary maneuvering of the manipulator arm. In one embodiment, one or more rendezvous sensors, such as rendezvous cameras, are employed as sensors to assist or enable the maneuvering of the manipulator arm. As another example, a sensor, such as lidar, may be positioned or mounted on the manipulator arm second end 844 to assist and/or enable maneuvering of the manipulator arm, such as when engaged with or attached to the servicer umbilical second end 654.

The set of extension guides 886, 887 define a cone shaped extension to assist in precise control or positioning of the servicer umbilical second end face 882. Specifically, the set of extension guides 886, 887 may, in one configuration, physically engage a perimeter surface surrounding the body 820 of the client spacecraft. In one configuration, the set of extension guides 886, 887 are retractable. In one embodiment, a cone-like guide is fitted to the end of the servicer umbilical second end face 882 and/or the manipulator arm second end 844 to assist in precise control of the servicer umbilical second end face 882. In one embodiment, a protective cover is fitted to extend from the servicer umbilical second end face 882 and/or the manipulator arm second end 844 to shroud or cover the connected interface of the servicer umbilical connector second end 954 when plugged into the client spacecraft end connector 40.

As briefly discussed above, in some embodiments the manipulator arm 140 is not required to remain attached to the servicer umbilical during servicing of the client because the servicer umbilical second end face 882, once plugged into the client umbilical connector second end 954, remains securely plugged in without requiring continued connection with the manipulator arm 140. The unaided continuous plug-in of the servicer umbilical into the umbilical connector 40 may be provided by features of the servicer umbilical second end 854. For example, the servicer umbilical second end 854 may form an interference fit or friction fit with the client umbilical connector second end 954 such that once the two are plugged-in together, the connection is stable and secure. In another example, the servicer umbilical second end 854 may comprise slots or other geometries or features known to those skilled in the art to provide a secure and stable physical connection. A "secure and stable connection" means a connection that remains connected, even when in receipt of relatively minor force disturbances such as vibration, force impacts such as jarring, and twists or rotations. In another example, the set of male/female clocking connections (the set of three closing extensions 891, 892, and 893 of servicer umbilical second end face 882 which engage with respective clocking divots 991, 992, and 993) provide a stable and secure connection.

It is noted that during plugging (and unplugging) operations between the servicer umbilical second end 854 and the client umbilical connector second end 954, a force may be imparted to one or more components of the joined servicer-client system, e.g. the set of capture arms, the manipulator arm, etc. In the examples described above involving an interference fit and clocking fits, such forces would be transferred to one or more system components.

In some embodiments and/or operations, no such forces, or de minimus forces, are so imparted during plugging and/or unplugging. For example, in the configuration of FIG. 7, the set of extension guides 886, 887 may permit or enable plugging and unplugging operations that transfer no or minimal forces to the system. In one embodiment, the set of extension guides 886, 887 are configured to provide a secure attachment to the perimeter around or area adjacent to the umbilical connector face 954 such that no or minimal force transfer to the system is imparted to the joined servicer-client system. In one embodiment, the set of extension guides 886, 887 form or are instead a continuous or near-continuous funnel shape (wider in diameter as the shape extends away from the client umbilical connector second end 954), the funnel shape engaging with a perimeter around or area adjacent to the umbilical connector face 954 such that no or minimal force transfer to the system is imparted to the joined servicer-client system.

The servicer umbilical second end 854 of FIG. 8 is depicted routing out of the interior of the manipulator arm second end 844 through manipulator arm second end window 846. The interior of the servicer umbilical is depicted to show bundle of wires 856 held within the servicer umbilical. The number and type of wires in the bundle of wires 856 are a function of, among other things, the functions performed by the umbilical connector as conventionally used during ground operations to communicate with the client.

FIG. 9 is flow diagram of a method of use of the operation of the manipulator arm and the servicer umbilical end during precise control operations near the client umbilical connector, as detailed in FIG. 8. The method 900 of FIG. 9 will be described with reference to other figures of the disclosure, in particular FIGS. 3 and 8.

Generally, the method 900 starts at step 904 and ends at step 940. Any of the steps, functions, and operations discussed herein can be performed continuously and automatically. In some embodiments, one or more of the steps of the method of use 900, to include steps of the method 900, may comprise computer control, use of computer processors, and/or some level of automation. Indeed, most if not all of the steps of method 900 are performed automatically, principally if not entirely by processor 320. However, in some embodiments some of the steps or parts of some of the steps are performed in concert with or exclusively with human intervention. For example, a human operator may be tasked to confirm a final advance of the servicer umbilical second end at step 928, to confirm a final rotation of the servicer umbilical second end at step 932, and/or to confirm a power on electrical energy transfer between servicer and client (e.g. step 728 of method 700).

The steps are notionally followed in increasing numerical sequence, although, in some embodiments, some steps may be omitted, some steps added, and the steps may follow other than increasing numerical order. A user may interact or perform one or more of the described steps be using a display/GUI.

After starting at step 904, the method 900 proceeds to step 908. At step 908, the manipulator arm 140 maneuvers the attached servicer umbilical 150 to a position adjacent or near the client umbilical connector 40. The processor 360 may operate in a first positioning control mode during step 908. Step 908 is similar to step 716 of method 700 and as depicted in FIG. 6C. After completion of step 908, the method 900 continues to step 912.

At step 912, the precise position control system is activated and/or becomes the dominant control means of the manipulator arm. The precise position control is enabled by, in one embodiment, the one or more sensors 885 and/or the set of extension guides 886, 887, as operated and/or controlled by processor 360. In one embodiment, the precise position control may only be activated when the manipulator arm second end 844, with coupled servicer umbilical second end face 882, is near the umbilical connector face 982 to conserve power dissipated in operating the one or more sensors 885. After completion of step 912, the method 900 continues to step 912.

At step 916, the z axes of the servicer umbilical second end face 882 is substantially aligned with the umbilical connector z axis 956, as depicted in FIGS. 8 and 6D. After completion of step 916, the method 900 continues to step 924.

At step 924, an initial physical contact is made between the set of extension guides 886, 887 and a surrounding surface of the body 820 of client spacecraft. Upon such contact (as measured by any of several means, to include a force sensor mounted at the distal end of one or both of extension guides 886, 887), the advancement of the servicer umbilical second end face 882 may be stopped to perform checks such as integrity checks on system operation before proceeding. Also, a human confirmation of a go/no-go for securing a connection may be performed. After completion of step 924, the method 900 continues to step 928.

At step 928, the servicer umbilical second end face 882 is advanced along z axis 956 toward the umbilical connector face 982. During advancement, the set of extension guides 886, 887 may retract completely or partially so as to disconnect from physical contact with the body 820 of client, or may retract in a telescoping manner or otherwise so as not to prevent or restrict advancement of the servicer umbilical second end face 882. After completion of step 928, the method 900 continues to step 932.

At step 932, with aid of the one or more sensors 885 as controlled by the processor 360, the servicer umbilical second end face 882 is rotated to align with the umbilical connector face 982. More specifically, a rotation of the servicer umbilical second end face 882 is performed so as to align the set of three closing extensions 891, 892, and 893 with respective clocking divots 991, 992, and 993, align the pair of pins 897 and 898 with respective pin receiver divots 997 and 998, and to align rectangular pin plug 895 with rectangular pin port 995. Such a rotational alignment aligns the servicer umbilical second end face 882 with the umbilical connector face 982 such that servicer umbilical second end face angle γ is substantially if not completely zeroed out. After completion of step 932, the method 900 continues to step 936.

At step 936, the servicer umbilical second end face 882 undergoes final advance along z axis 956 to form a connection with the umbilical connector face 982. After completion of step 936, the method 900 ends at step 940.

The exemplary systems and methods of this disclosure have been described in relation to systems and methods of use of providing in-orbit servicing to a spacecraft, such as a satellite. Other uses or applications to the disclosed systems and methods are possible, such as servicing of space telescopes, space stations, etc. Also, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An in-orbit spacecraft servicing system comprising:
   a servicer spacecraft comprising:
      a servicer body;
      a set of capture arms extending from the body and operating to engage a client in-orbit spacecraft;
      a servicer umbilical with a servicer umbilical first end attached to the servicer body and a servicer umbilical second end fitted with a servicer umbilical end connector, the servicer umbilical end connector configured to form a connection with a client umbilical connector of the client in-orbit spacecraft;
      a manipulator arm with a manipulator arm first end coupled to the servicer body and a manipulator arm second end configured to attach to, detach from, and maneuver the servicer umbilical; and
      a processor operating to control the manipulator arm;
   wherein:
      when the servicer spacecraft is operating in-orbit, the manipulator arm is configured to: i) attach to the servicer umbilical, and ii) maneuver the servicer umbilical to form a connection between the servicer umbilical end connector and the client umbilical connector.

2. The system of claim 1, wherein the servicer umbilical first end is attached to the servicer body at a servicer umbilical attachment point and the manipulator arm first end is attached to the servicer body at a servicer manipulator arm attachment point, the servicer umbilical attachment point separated from the servicer manipulator arm attachment point.

3. The system of claim 1, wherein the servicer umbilical end connector comprises a circular end lip that forms a radially concentric connection with a longitudinal axis of the client umbilical connector, the circular end lip enclosing an electrical connection between the servicer umbilical end connector and the client umbilical connector.

4. The system of claim 1, wherein, when the servicer spacecraft is operating in-orbit, electrical power is transferred from the servicer spacecraft to the client in-orbit spacecraft through the servicer umbilical.

5. The system of claim 1, the servicer spacecraft further comprising a service package configured to attach to the client umbilical connector.

6. The system of claim 5, wherein the service package provides electrical power to the client in-orbit spacecraft through the umbilical connector.

7. The system of claim 1, wherein the set of capture arms is configured to engage an interface ring of the client in-orbit spacecraft at a selectable interface ring clocking position.

8. The system of claim 1, wherein the connection formed between the servicer umbilical end connector and the client umbilical connector remains secure after the manipulator arm detaches from the servicer umbilical.

9. The system of claim 1, wherein the servicer umbilical comprises a set of electrical cables configured to transfer at least one of electrical power and electrical signals to the client in-orbit spacecraft.

10. The system of claim 1, wherein the servicer umbilical end connector is coupled to at least one sensor, the at least one sensor providing sensor data to the processor to facilitate the servicer umbilical end connector to form the connection with the client umbilical connector.

11. The system of claim 10, wherein the at least one sensor is a micro camera.

12. The system of claim 11, wherein the servicer umbilical end connector is further coupled to an extension guide, the extension guide forming a cone shaped extension from the servicer umbilical end connector to facilitate alignment of a servicer umbilical end connector with a client umbilical connector z-axis.

13. An in-orbit spacecraft servicing system comprising:
a servicer spacecraft comprising:
    a servicer body;
    a set of two or more capture arms extending from the servicer body and operating to engage a client in-orbit spacecraft;
    a servicer umbilical with a servicer umbilical first end attached to the servicer body and a servicer umbilical second end fitted with a servicer umbilical end connector, the servicer umbilical end connector configured to form a connection with a client umbilical connector of the client in-orbit spacecraft;
    a manipulator arm with a manipulator arm first end coupled to the servicer body and a manipulator arm second end fitted with a sensor and configured to maneuver the servicer umbilical;
    an auxiliary power supply; and
    a processor operating to control the manipulator arm;
wherein when the servicer spacecraft is operating in space:
    the sensor provides sensor data to the processor to facilitate the servicer umbilical end connector to form the connection with the client umbilical connector;
    the servicer umbilical comprises a set of electrical cables configured to transfer at least one of electrical power and electrical signals to the client in-orbit spacecraft;
    the auxiliary power supply provides electrical power from the servicer spacecraft to the client in-orbit spacecraft through the servicer umbilical; and
    the manipulator arm is configured to attach to the servicer umbilical and maneuver the servicer umbilical to form a connection between the servicer umbilical end connector and the client umbilical connector.

14. A method of servicing an in-orbit spacecraft, the method comprising:
providing a servicer spacecraft comprising:
    a servicer body;
    a set of capture arms extending from the servicer body and operating to engage a client in-orbit spacecraft;
    a servicer umbilical with a servicer umbilical first end attached to the servicer body and a servicer umbilical second end fitted with a servicer umbilical end connector, the servicer umbilical end connector configured to form a connection with a client umbilical connector of the client in-orbit spacecraft;
    a manipulator arm with a manipulator arm first end coupled to the servicer body and a manipulator arm second end configured to detach from and attach to the servicer umbilical and to maneuver the servicer umbilical; and
    a processor operating to control the manipulator arm;
coupling the servicer spacecraft and the client in-orbit spacecraft using the set of capture arms;
attaching the manipulator arm to the servicer umbilical;
controlling the manipulator arm to position the servicer umbilical second end to a position adjacent the client umbilical connector; and
plugging the servicer umbilical end connector into the client umbilical connector;
wherein:
an electrical connection is formed between the servicer spacecraft and the client in-orbit spacecraft.

15. The method of claim 14, further comprising the step of transferring electrical power from the servicer spacecraft to the client in-orbit spacecraft through the electrical connection.

16. The method of claim 14, further comprising the step of transferring electrical signals from the servicer spacecraft to the client in-orbit spacecraft through the electrical connection.

17. The method of claim 14, further comprising the step of rotating the servicer umbilical end connector to a selected clock position of the client umbilical connector.

18. The method of claim 14, further comprising the step of processing a set of signals from a sensor mounted on the servicer umbilical, the set of signals enabling precise positioning of the servicer umbilical second end to a position adjacent the client umbilical connector.

19. The method of claim 14, wherein the set of capture arms engage an interface ring of the client in-orbit spacecraft.

20. The method of claim 14, wherein the servicer umbilical first end is attached to the servicer body at a servicer umbilical attachment point and the manipulator arm first end is attached to the servicer body at a servicer manipulator arm attachment point, the servicer umbilical attachment point separated from the servicer manipulator arm attachment point.

* * * * *